US008885173B2

(12) United States Patent
Ohtsuka et al.

(10) Patent No.: US 8,885,173 B2
(45) Date of Patent: Nov. 11, 2014

(54) FILM THICKNESS MEASUREMENT DEVICE AND FILM THICKNESS MEASUREMENT METHOD

(75) Inventors: Kenichi Ohtsuka, Hamamatsu (JP); Tetsuhisa Nakano, Hamamatsu (JP); Motoyuki Watanabe, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 194 days.

(21) Appl. No.: 13/497,722

(22) PCT Filed: Jul. 27, 2010

(86) PCT No.: PCT/JP2010/062607
§ 371 (c)(1),
(2), (4) Date: Mar. 22, 2012

(87) PCT Pub. No.: WO2011/045967
PCT Pub. Date: Apr. 21, 2011

(65) Prior Publication Data
US 2012/0218561 A1    Aug. 30, 2012

(30) Foreign Application Priority Data

Oct. 13, 2009 (JP) ................................. 2009-236449

(51) Int. Cl.
*G01B 11/02* (2006.01)
*G01B 11/06* (2006.01)
(52) U.S. Cl.
CPC .................................. *G01B 11/0625* (2013.01)
USPC ......................................................... 356/504
(58) Field of Classification Search
CPC .............. G01N 11/06; G01N 11/0616; G01N 11/0625; G01N 11/0633; G01N 11/0683

USPC .................................................... 356/503, 504
See application file for complete search history.

(56) References Cited

U.S. PATENT DOCUMENTS 4,293,224 A * 10/1981 Gaston et al. ................. 356/504
4,872,758 A    10/1989 Miyazaki et al.
5,619,329 A    4/1997 Otani
6,547,854 B1   4/2003 Gray et al.
6,806,948 B2 * 10/2004 Katz et al. ....................... 356/72
(Continued)

FOREIGN PATENT DOCUMENTS

CN          1664493        9/2005
CN         101261116       9/2008
(Continued)

*Primary Examiner* — Michael A Lyons
(74) *Attorney, Agent, or Firm* — Drinker Biddle & Reath LLP

(57) ABSTRACT

A film thickness measurement apparatus includes a measurement light source which supplies measurement light containing wavelength components over a predetermined band to a semiconductor film, a spectroscopic optical system and a photodetector which detect intensities of output light formed by superimposing reflected light components from an upper surface and a lower surface of the semiconductor film at each time point by wavelength, and a film thickness analysis section which obtains a temporal change in film thickness of the semiconductor film. The film thickness analysis section obtains a value corresponding to a peak wavelength where the intensity of interfering light generated by the reflected light from the upper surface and the reflected light from the lower surface interfering with each other is maximized or minimized or an interval of the adjacent peak wavelengths based on spectral waveforms of the output light detected at mutually different time points.

10 Claims, 18 Drawing Sheets

(56) References Cited

U.S. PATENT DOCUMENTS

| | | | |
|---|---|---|---|
| 7,411,684 B2 * | 8/2008 | Usui et al. | 356/503 |
| 7,652,774 B2 * | 1/2010 | Lian et al. | 356/503 |
| 7,998,358 B2 * | 8/2011 | Benvegnu et al. | 216/84 |
| 2004/0227955 A1 | 11/2004 | Kudou et al. | |
| 2005/0194095 A1 * | 9/2005 | Usui et al. | 156/345.28 |
| 2008/0099443 A1 | 5/2008 | Benvegnu et al. | |

FOREIGN PATENT DOCUMENTS

| | | |
|---|---|---|
| CN | 101294795 | 10/2008 |
| EP | 1 124 255 | 8/2001 |
| EP | 1416247 | 5/2004 |
| JP | 55-75605 | 6/1980 |
| JP | 63-50703 | 3/1988 |
| JP | 63-122906 | 5/1988 |
| JP | 6-252113 | 9/1994 |
| JP | 2612089 | 5/1997 |
| JP | 2656869 | 9/1997 |
| JP | 11-14312 | 1/1999 |
| JP | 11-132726 | 5/1999 |
| JP | 2000097648 A * | 4/2000 |
| JP | 2002-181514 | 6/2002 |
| JP | 3491337 | 1/2004 |
| JP | 2005-084019 | 3/2005 |
| JP | 2010-230515 | 10/2010 |
| TW | 200406578 | 5/2004 |
| TW | 200712431 | 4/2007 |
| WO | WO 03/027609 | 4/2003 |
| WO | WO 2004/113829 | 12/2004 |

* cited by examiner

FILM THICKNESS MEASUREMENT DEVICE AND FILM THICKNESS MEASUREMENT METHOD

TECHNICAL FIELD

The present invention relates to a film thickness measurement apparatus and a film thickness measurement method for measuring a temporal change in film thickness of a film-shaped measuring object such as a semiconductor film formed on a substrate.

BACKGROUND ART

In a semiconductor manufacturing process, for example, during execution of an etching process, a film thickness of a semiconductor film on a substrate changes with time to decrease. During execution of a thin-film formation process, a film thickness of a semiconductor film changes with time to increase. In such a semiconductor process, for process control such as detection of an end point of the process, etc., in-situ measurement of a temporal change in film thickness of the semiconductor film is necessary.

As such a measurement method for the film thickness of a semiconductor film, there is used a method in which a semiconductor film is irradiated with measurement light with a predetermined wavelength, and interfering light generated by interference of reflected light from the upper surface and reflected light from the lower surface of the semiconductor film is detected. In this method, when the film thickness of the semiconductor film changes, an optical path length difference between the reflected light from the upper surface and the reflected light from the lower surface changes. Therefore, by utilizing a temporal change in detected intensity (interfering light intensity) of the interfering light corresponding to the change in optical path length difference, film thicknesses of the semiconductor film at each time point can be measured.

For example, the film thickness measurement apparatus described in Patent Document 1 disperses transmitted light or reflected light from a to-be-measured object by spectroscopic means to detect interference fringes, and calculates a film thickness of the to-be-measured object from an output for an extremal value when a difference between the maximum value and minimum value of the detected outputs in terms of each wavelength is a predetermined value. Patent Document 2 describes a technique, in a semiconductor thickness non-contact measurement apparatus which irradiates a measuring portion with a light beam from a wavelength variable laser, and detects signal light due to reflected light or transmitted light obtained from the measuring portion, for varying the wavelength of the wavelength variable laser while detecting the intensity of signal light, obtaining a phase change amount from an obtained waveform of changes in light intensity, and obtaining, based on this phase change amount, a semiconductor thickness from a relational expression between the absolute value of a semiconductor thickness and the phase change amount of the signal light intensity.

CITATION LIST

Patent Literature

Patent Document 1: Japanese Patent Application Laid-Open No. S63-50703
Patent Document 2: Japanese Patent Publication No. 3491337

SUMMARY OF INVENTION

Technical Problem

When a thin film having a film thickness d and a refractive index n is irradiated with light having a wavelength $\lambda$, interfering light intensity I is expressed by the following equation (1). A and B in the equation are constants that are determined by the reflectances at upper and lower boundary surfaces of the thin film.

[Equation 1]

$$I \approx A\cos\left(2\pi\frac{2nd}{\lambda}\right) + B \tag{1}$$

As is apparent from equation (1), the interfering light intensity I alternates between strong and weak to assume a cosine wave when the film thickness d changes. In film thickness measurement in a semiconductor process, the film thickness d monotonically increases (or decreases) with the elapse of time, so that the interfering light intensity I results in a cosine wave function that uses time as a variable. Therefore, in conventional film thickness measurement, by repeatedly detecting a peak of the interfering light intensity I that changes with the elapse of time, the amount of relative change in film thickness d is obtained.

This method is effective for obtaining a sufficiently large amount of relative change in film thickness d to such an extent that the interfering light intensity I has a peak several times, however, in the case of measuring such a minute amount of relative change in film thickness d as to be less than one peak period of the interfering light intensity I, it is difficult to secure sufficient measurement accuracy.

Here, as another method for measuring the film thickness d, considered is, for example, a method of irradiating a thin film with broadband light such as white light, observing a wavelength (peak wavelength) that is the maximum or minimum in a spectrum of interfering light obtained, and obtaining the film thickness d from a change in the peak wavelength. However, reflected light obtained as a result of irradiating a thin film with broadband light contains, together with interfering light, a bright line spectrum, etc., that had been contained in the broadband light, and there is a problem that accurately obtaining only a peak wavelength of interfering light from the reflected light is difficult.

As a method for solving such a problem, considered is a method of placing a reference sample next to a thin film and canceling a spectrum of reflected light from the reference sample from a spectrum of reflected light from the thin film. However, in thin-film measurement in a semiconductor process, it is necessary to place the reference sample inside a film formation chamber where the temperature and pressure change greatly, so that its handling is difficult.

Also, in the apparatus described in Patent Document 1, spectral characteristics of a light source such as a bright line spectrum have not been taken into consideration, so that the film thickness may not be able to be accurately obtained. Further, in the apparatus described in Patent Document 2, because measurement is performed by use of a reference optical system (reference sample), there is a problem that its handling is difficult in a semiconductor process as described above.

The present invention has been made in view of the problems described above, and an object thereof is to provide a film thickness measurement apparatus and a film thickness measurement method by which, even with such a minute amount of relative change in film thickness as to be less than one peak period of the interfering light intensity, the amount of change in film thickness can be accurately measured.

Solution to Problem

In order to achieve the above-described object, a film thickness measurement apparatus according to the present invention is for measuring a temporal change in film thickness of a film-shaped measuring object having a first surface and a second surface, and includes a measurement light source supplying measurement light containing wavelength components over a predetermined band to the measuring object, detection means detecting intensities of output light, formed by superimposing reflected light of the measurement light from the first surface of the measuring object and reflected light of the measurement light from the second surface, at each time point by wavelength, and film thickness analysis means obtaining a temporal change in film thickness of the measuring object, and the film thickness analysis means obtains a value corresponding to a peak wavelength where an intensity of interfering light generated by the reflected light from the first surface and the reflected light from the second surface interfering with each other is maximized or minimized or an interval of the adjacent peak wavelengths based on spectral waveforms of the output light respectively detected at two or more time points different from each other by the detection means, and obtains a temporal change in film thickness of the measuring object from a temporal change in the value corresponding to the peak wavelength or the interval of the adjacent peak wavelengths.

Similarly, a film thickness measurement method according to the present invention is for measuring a temporal change in film thickness of a film-shaped measuring object having a first surface and a second surface, and includes a measurement light supply step of supplying measurement light containing wavelength components over a predetermined band from a measurement light source to the measuring object, a detection step of detecting intensities of output light, formed by superimposing reflected light of the measurement light from the first surface of the measuring object and reflected light of the measurement light from the second surface, at each time point by wavelength, and a film thickness analysis step of obtaining a temporal change in film thickness of the measuring object, and in the film thickness analysis step, a value corresponding to a peak wavelength where an intensity of interfering light generated by the reflected light from the first surface and the reflected light from the second surface interfering with each other is maximized or minimized or an interval of the adjacent peak wavelengths is obtained based on spectral waveforms of the output light respectively detected at two or more time points different from each other in the detection step, and a temporal change in film thickness of the measuring object is obtained from a temporal change in the value corresponding to the peak wavelength or the interval of the adjacent peak wavelengths.

When a film-shaped measuring object is irradiated with measurement light containing wavelength components over a predetermined band, its reflected light (output light) spectrum contains an unnecessary peak such as a bright line spectrum as previously described. However, a center wavelength of such an unnecessary peak caused by the light source remains unchanged irrespective of a change in film thickness of the measuring object. Therefore, the present inventors have discovered that, by using spectral waveforms of output light detected at two or more time points different from each other, the influence of a bright line spectrum, etc., can be eliminated to accurately obtain a value corresponding to a peak wavelength of interfering light or a wavelength interval thereof.

Namely, in the film thickness measurement apparatus and the film thickness measurement method described above, the film thickness analysis means (film thickness analysis step) obtains a value corresponding to a peak wavelength where the intensity of interfering light from the first surface and the second surface is maximized or minimized or a wavelength interval thereof based on spectral waveforms of the output light detected at two or more time points different from each other, and obtains a temporal change in film thickness of the measuring object from a temporal change in the value corresponding to the peak wavelength or the wavelength interval thereof. Therefore, according to the film thickness measurement apparatus and the film thickness measurement method described above, it becomes possible to accurately obtain only a peak wavelength (or a value corresponding to a wavelength interval thereof) of interfering light from reflected light (output light) containing a bright line spectrum, etc., so that even with a minute amount of relative change in film thickness as to be less than one peak period of the interfering light intensity, the amount of change in film thickness can be accurately measured.

Advantageous Effects of Invention

By the film thickness measurement apparatus and the film thickness measurement method according to the present invention, even with such a minute amount of relative change in film thickness as to be less than a peak period of the interfering light intensity, the change amount in film thickness can be accurately measured.

DESCRIPTION OF EMBODIMENTS

Hereinafter, embodiments of a film thickness measurement apparatus and a film thickness measurement method according to the present invention will be described in detail with reference to the accompanying drawings. In the description of the drawings, elements identical to each other are provided with the same reference symbols, and overlapping description will be omitted.

(First Embodiment)

Figure 1:
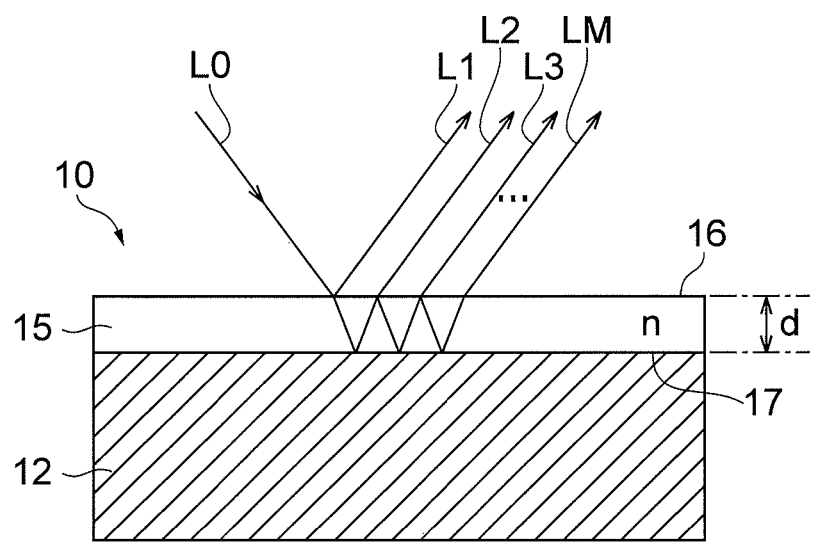
FIG. 1 is a view schematically showing a film thickness measurement method for a measuring object.

First, a film thickness measurement method according to the present invention and a principle of measurement according to the method will be described. FIG. 1 is a view schematically showing a measurement method for measuring the film thickness of a measuring object. The present film thickness measurement method is a method for measuring an amount of temporal change in film thickness of a film-shaped measuring object having a first surface and a second surface. Hereinafter, description is given by setting the first surface of the measuring object as an upper surface on which measurement light is incident, and the second surface as a lower surface on the side opposite to the first surface.

In the example shown in FIG. 1, as an example of the film-shaped measuring object, a semiconductor film 15 formed on a substrate 12 is shown. It is assumed that a film forming process or an etching process is applied to this semiconductor film 15 as an example of a semiconductor manufacturing process that causes the film thickness to change with time. In the film forming process, the film thickness d of the semiconductor film 15 increases with time according to progress of the process. In the etching process, the film thickness d of the semiconductor film 15 decreases with time according to progress of the process.

For the temporal change in film thickness d, measurement light L0 for film thickness measurement is supplied to a sample 10 including the substrate 12 and the semiconductor film 15 from the upper surface (first surface) 16 side of the semiconductor film 15 on the side opposite to the substrate 12. Then, by detecting interfering light generated by interference of a reflected light component L1 from the upper surface 16 and reflected light components L2 to LM from the lower surface (second surface, that is, the boundary surface between the substrate 12 and the semiconductor film 15) 17, the film thickness d of the semiconductor film 15 is measured.

In this measurement method, in detail, the sample 10 including the semiconductor film 15 is irradiated with the measurement light L0 containing at least wavelength components over a predetermined band (measurement light supply step). Next, the intensity of output light formed by superimposing the reflected light components L1 to LM from the upper surface 16 and the lower surface 17 of the measurement light L0 is made detectable by wavelength, and by detecting the intensities of the wavelength components contained in the output light at each time point, a change in spectrum of the output light with time is acquired (detection step). Then, by referring to the temporal change in output light spectrum, a temporal change in film thickness d of the semiconductor film 15 is obtained (film thickness analysis step).

Here, when n is a refractive index of the semiconductor film 15 as a measuring object, d is the film thickness that changes with time, and $\lambda$ is a certain wavelength contained in the measurement light L0, the intensity I of the interfering light generated by interference of the reflected light components L1 to LM is expressed by the following equation (2). Here, the reflected light components L3 to LM result in a very weak intensity due to attenuation in the semiconductor film 15 as a measuring object. Therefore, the intensity I may be approximated as a spectrum generated by interference between the reflected light L1 and the reflected light L2.

[Equation 2]

$$I \approx A\cos\left(2\pi\frac{2nd}{\lambda}\right) + B \qquad (2)$$

Namely, when the measurement light L0 with a wavelength $\lambda$, is used, the intensity I of interfering light obtained changes to assume a cosine wave according to a temporal change of the film thickness d due to the etching process or the like. Here, A and B are constants that are determined by the reflectances at upper and lower boundary surfaces of the thin film.

Figure 2:
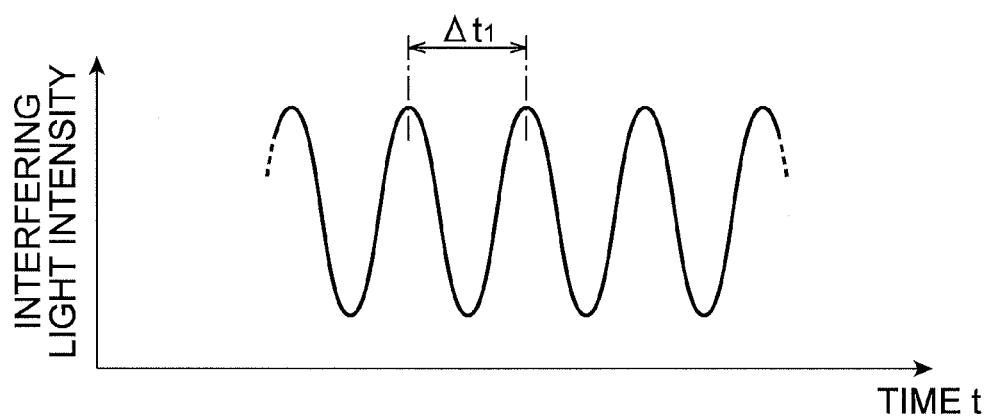
FIG. 2 is a graph showing an example of a temporal change in intensity I of interfering light.

FIG. 2 is a graph showing an example of such a temporal change in intensity I of the interfering light. By counting peaks (tops or bottoms) in the interfering light intensity I in FIG. 2, the amount of temporal change in film thickness d can be obtained. The change rate (for example, etching rate) in film thickness d can be obtained by measuring the time thereof. Here, one period $\Delta t_1$ of the change in interfering light intensity I shown in FIG. 2 corresponds to time the film thickness d changes by $\Delta d=\lambda/2n$.

This method is effective when the amount of change in film thickness d of the semiconductor film 15 is sufficiently large to such an extent that a peak (top or bottom) of the interfering light intensity I can be counted a plurality of times, however, when the amount of change in film thickness d of the semiconductor film 15 is small to such an extent as to be less than a repetition period (period $\Delta t_1$ in the figure) of peaks in the interfering light intensity I, it is difficult to obtain the change amount of the film thickness d from a temporal change in interfering light intensity I, which makes it difficult to secure sufficient measurement accuracy.

Therefore, in the film thickness analysis step of the present measurement method, first, output light is detected at two or more time points different from each other, and a peak wavelength where the interfering light intensity I is maximized or minimized is obtained based on respective spectral waveforms of those output light components. Then, a temporal change in film thickness d of the semiconductor film 15 is obtained from a temporal change in the obtained peak wavelength. Hereinafter, this measurement method will be specifically described.

Figure 3:
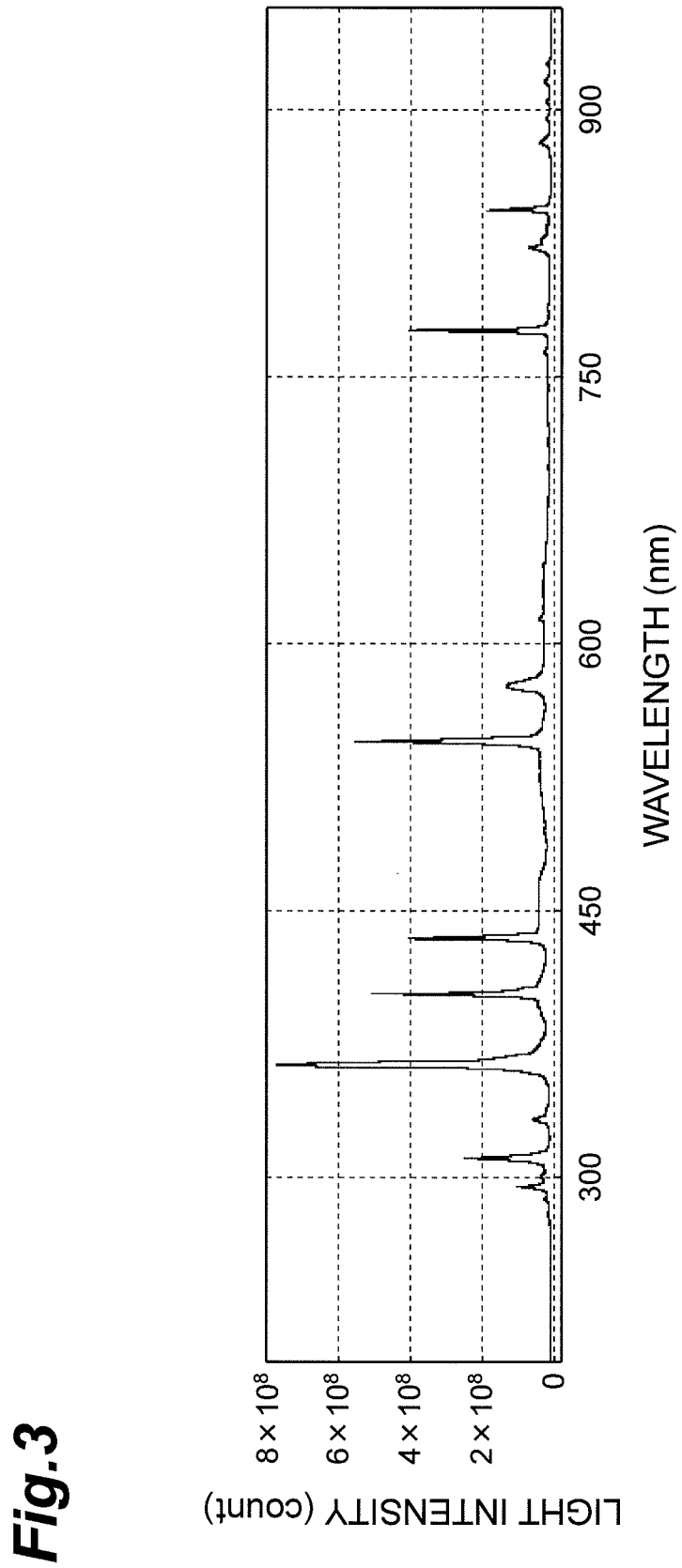
FIG. 3 is a graph showing an example of an output light spectrum when a semiconductor film 15 is irradiated with measurement light L0 containing at least wavelength components over a predetermined band.

FIG. 3 is a graph showing an example of an output light spectrum when the semiconductor film 15 is irradiated with measurement light L0 containing at least wavelength components over a predetermined band. Usually, an output light spectrum contains not only a spectrum due to interfering light but also a bright line spectrum, etc., that had been contained in the measurement light L0. Therefore, even when a wavelength differential of the output light spectrum is simply calculated, a peak of the interfering light cannot be accurately detected under the influence of a bright line spectrum, etc., of a light source.

Here, when a film forming rate (or etching rate) r and time t are used to prove a film thickness d=rt processed in a semiconductor process, the interfering light intensity I is expressed from the above equation (2) as follows.

[Equation 3]
$$I = A\cos\left(2\pi\frac{2nrt}{\lambda}\right) + B \quad (3)$$

Then, temporal differentiation of equation (3) provides the following.

[Equation 4]
$$\frac{dI}{dt} = -A\left(2\pi\frac{2nr}{\lambda}\right)\sin\left(2\pi\frac{2nrt}{\lambda}\right) \quad (4)$$

The wavelength λ to provide (dI/dt)=0 is thereby expressed as follows.

[Equation 5]
$$\lambda = \frac{4nrt}{m} (m = 1, 2, 3 \ldots) \quad (5)$$

In the above equation (5), when m is an odd number, the reflected light components L1 to LM (particularly, L1 to L2) mutually weaken each other, and when m is an even number, the reflected light components L1 to LM (particularly, L1 to L2) mutually strengthen each other. Specifically, the equation serves as a conditional expression to indicate a peak (bottom) wavelength of the interfering light intensity I when m is an odd number, and the equation serves as a conditional expression to indicate a peak (top) wavelength of the interfering light intensity I when m is an even number. That is, it is indicated that the wavelength λ where the temporal differential (dI/dt) of the interfering light intensity I results in zero is a peak wavelength in the interfering light spectrum.

For this reason, it is considered that, by obtaining a wavelength λ, (hereinafter, referred to as a zero-cross wavelength) where a difference I(t+Δt, λ)−I(t, λ) between a first spectral waveform I(t, λ) of output light detected at a first time point $T_1$=t and a second spectral waveform I(t+Δt, λ) of output light detected at a second time point $T_2$=t+Δt different from the first time point $T_1$ becomes zero, a peak wavelength of an interfering light spectrum can be obtained.

Figure 4:
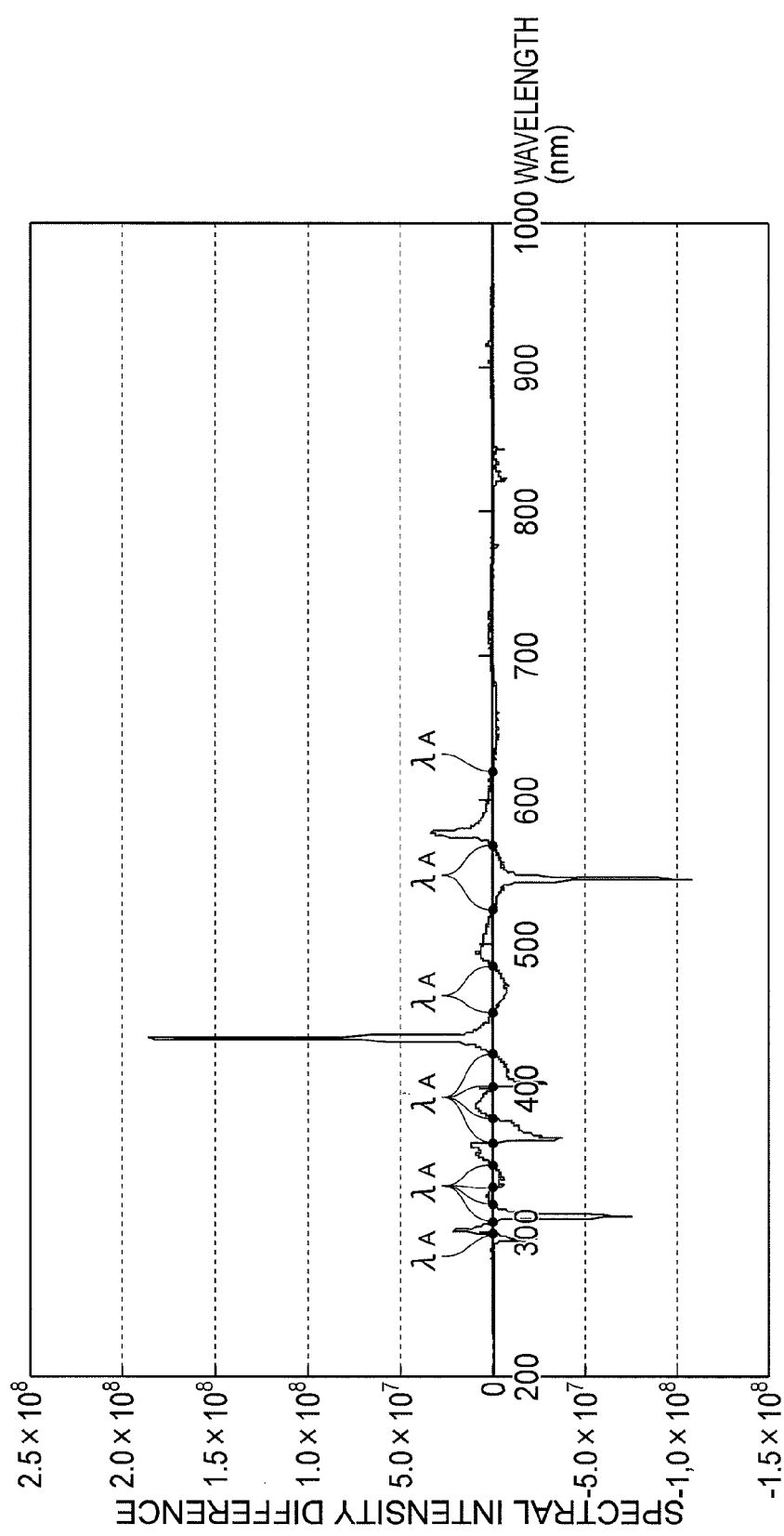
FIG. 4 is a graph showing an example of a difference $I(t+\Delta t, \lambda)-I(t, \lambda)$ when t=171 [sec] and $\Delta t$=5 [sec].

FIG. 4 is a graph showing an example of a difference I(t+Δt, λ)−I(t, λ) when t=171 [sec] and Δt=5 [sec]. As shown in FIG. 4, a peak that existed in the output light spectrum at the second time point $T_2$ appears as a positive peak, and a peak that existed in the output light spectrum at the first time point $T_1$ appears as a negative peak. Further, spectral components other than interfering light, such as a bright line spectrum that had been contained in measurement light L0, are fixed irrespective of a temporal change in film thickness d, and are thus canceled in the difference I(t+Δt, λ)−I(t, λ). In FIG. 4, because Δt is 5 [sec], which is small, a wavelength (zero-cross wavelength $\lambda_A$ in the figure) where the difference I(t+Δt, λ)−I(t, λ) becomes zero can be regarded as a peak wavelength of the interfering light spectrum. Here, if Δt is not more than 10 [sec], a wavelength (zero-cross wavelength $\lambda_A$ in the figure) where the difference I(t+Δt, λ)−I(t, λ) becomes zero can be regarded in this way as a peak wavelength of an interfering light spectrum.

Figure 5:
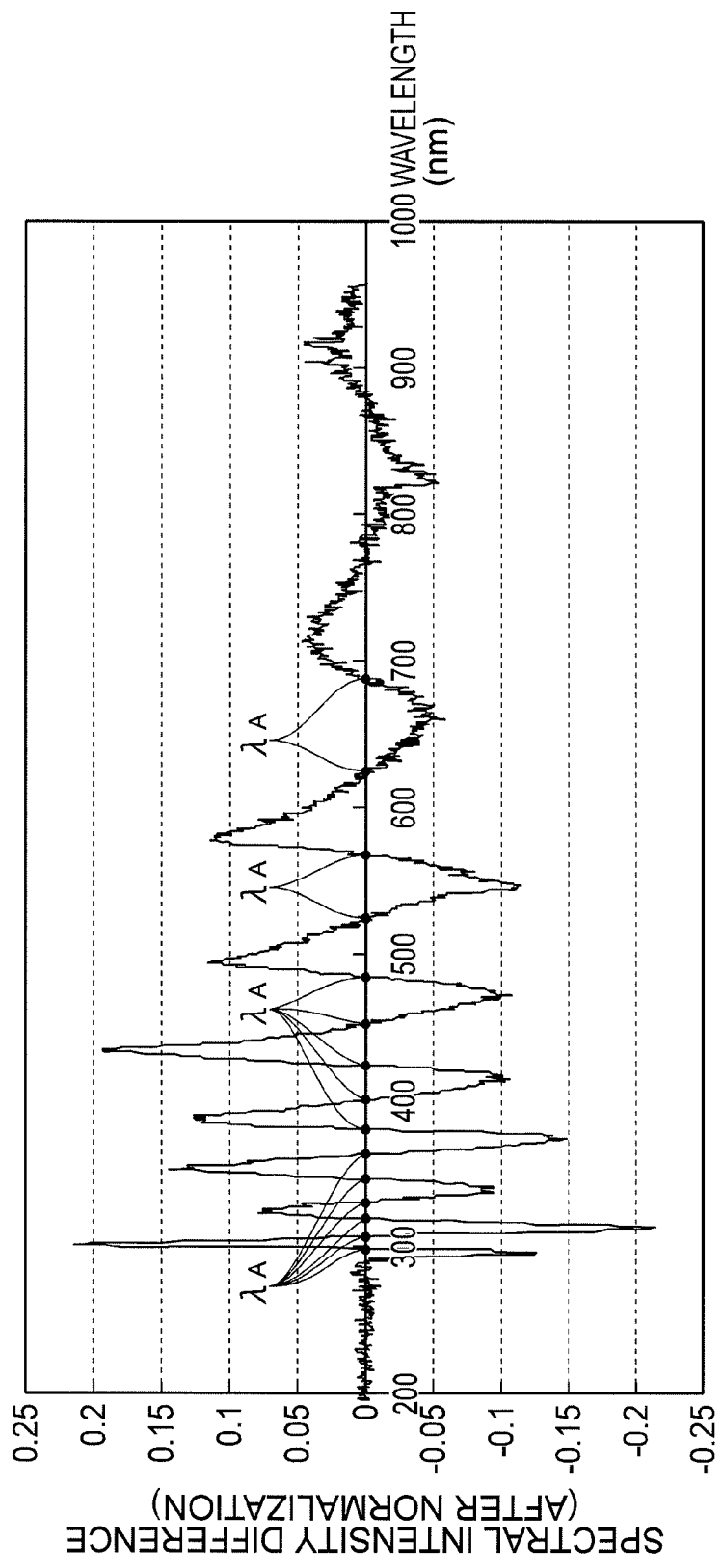
FIG. 5 is a graph of the difference $I(t+\Delta t, \lambda)-I(t, \lambda)$ shown in FIG. 4 normalized.

In the example shown in FIG. 4, because the light intensity greatly varies depending on the wavelength, the size of the difference I(t+Δt, λ)−I(t, λ) greatly varies depending on the wavelength. In this case, it is preferable to normalize the difference by use of a waveform I(t, λ)+I(t+Δt, λ) for which the first spectral waveform I(t, λ) and the second spectral waveform I(t+Δt, λ) are superimposed and then obtain a peak wavelength. Specifically, a wavelength where the difference normalized by the following equation (6):

[Equation 6]
$$\frac{I(t+\Delta t, \lambda) - I(t, \lambda)}{I(t+\Delta t, \lambda) + I(t, \lambda)} \quad (6)$$

becomes zero is obtained as a peak wavelength of the interfering light intensity I. FIG. 5 is a graph of the difference I(t+Δt, λ)−I(t, λ) shown in FIG. 4 normalized by the above equation (6). In FIG. 5, a wavelength (zero-cross wavelength $\lambda_A$ in the figure) where the normalized difference becomes zero can be regarded as a peak wavelength of an interfering light spectrum.

Here, based on equation (2), when the film thickness d of the semiconductor film 15 changes, the peak wavelength in the interfering light spectrum changes. For example, when the film thickness d is reduced by an etching process, the peak wavelength of the interfering light spectrum moves in a short wavelength direction. Conversely, when the film thickness d is increased by a film forming process, the peak wavelength of the interfering light spectrum moves in a long wavelength direction. Therefore, by measuring a movement amount of the peak wavelength (zero-cross wavelength), the amount of change in film thickness d can be known.

A condition for the reflected light components L1 to LM (particularly, L1 to L2) shown in FIG. 1 mutually strengthening each other is expressed by the following equation (7).

[Equation 7]
$$\begin{cases} m\lambda = 2nd \\ d = \frac{m\lambda}{2n} \end{cases} \quad (7)$$
$$m = 1, 2, 3 \ldots$$

In the above equation (7), when a change in peak wavelength λ of 1 [nm] is considered, the following equation (8) is obtained.

[Equation 8]

$$\begin{cases} m(\lambda - 1) = 2nd \\ d = \dfrac{m\lambda}{2n} - \dfrac{m}{2n} \end{cases} \quad (8)$$
$$m = 1, 2, 3 \ldots$$

Therefore, it can be understood that the film thickness d changes by (m/2n) when the peak wavelength λ changes by 1 [nm].

A specific value of m can be obtained as in the following. In equation (7), when adjacent peak wavelengths $\lambda_1, \lambda_2$ ($\lambda_1 > \lambda_2$) are considered, the condition can be expressed as follows.

[Equation 9]

$$\begin{cases} m\lambda_1 = 2n_1 d \\ (m+1)\lambda_2 = 2n_2 d \end{cases} \quad (9)$$

When regarding $n_1 = n_2$ on an assumption that the influence of wavelength dispersion of the refractive index is small at the peak wavelengths $\lambda_1, \lambda_2$, m can be obtained from the above equation (9) by the following equation (10).

[Equation 10]

$$m = \frac{\lambda_2}{\lambda_1 - \lambda_2} \quad (10)$$

When X is a movement amount of the peak wavelength (zero-cross wavelength) in the interfering light intensity I, the amount of change Δd in film thickness d can be obtained by the following equation (11).

[Equation 11]

$$\Delta d = \frac{X\lambda_2}{2n(\lambda_1 - \lambda_2)} \quad (11)$$

Based on the above, by setting in advance a measurement wavelength λ, a refractive index n of the semiconductor film 15 at the wavelength λ, and an amount $\Delta d_f$ of change in film thickness as a process end condition and monitoring a temporal change in zero-cross wavelength, the process (film forming process or etching process) can be ended with the target film thickness change amount $\Delta d_f$. The peak wavelengths $\lambda_1, \lambda_2$ in equation (11) are detected as zero-cross wavelengths closest to the set measurement wavelength λ.

Figure 6:
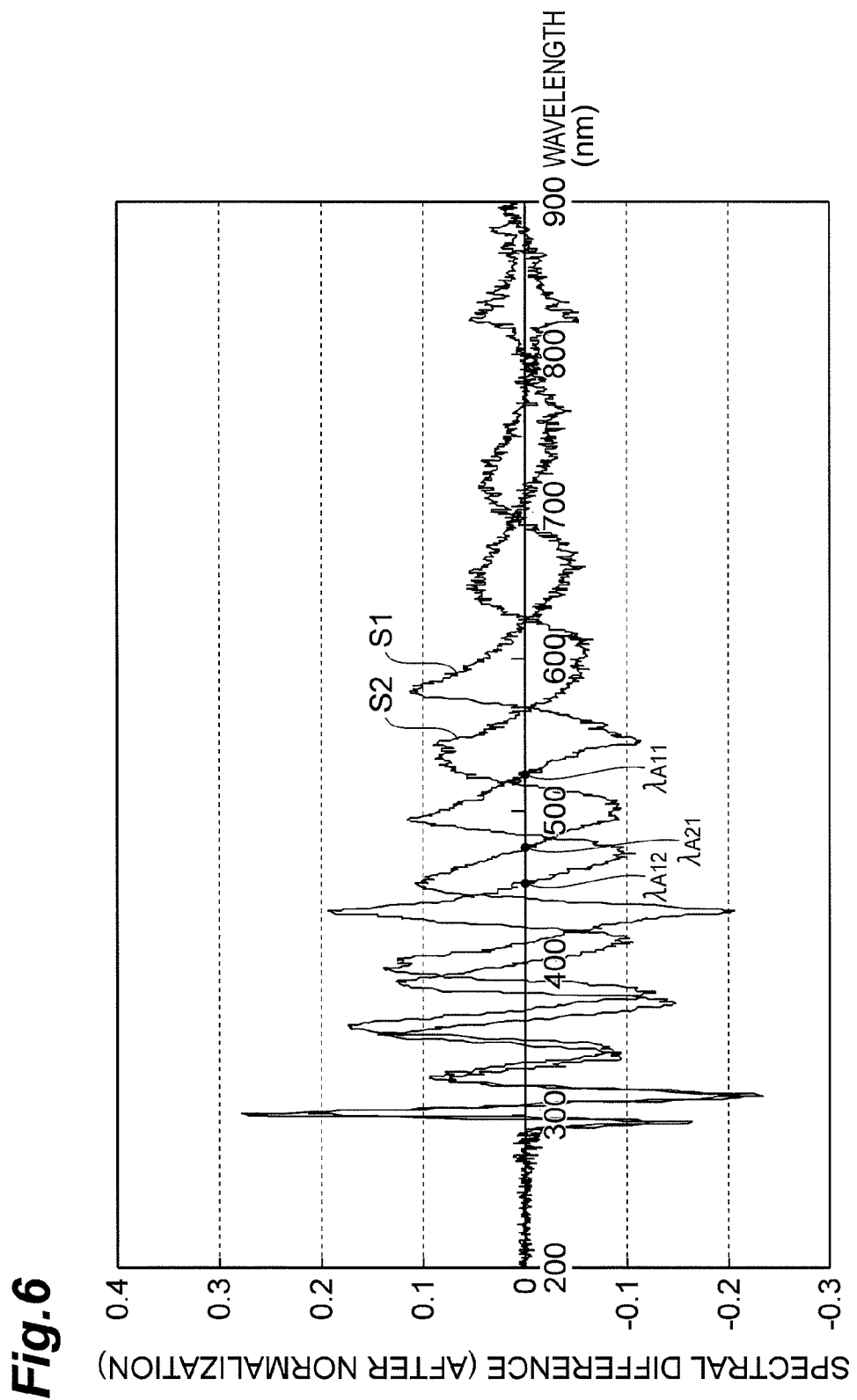
FIG. 6 is a graph showing normalized difference spectral waveforms S1 and S2 in a measurement wavelength of 300 to 900 [nm].

Here, an example of a method for obtaining a film thickness d from a normalized difference spectrum is shown. FIG. 6 shows normalized difference spectral waveforms S1 and S2 in a measurement wavelength of 300 to 900 [nm]. The difference spectral waveform S1 is a difference spectral waveform at a time point $T_1$=171 [sec]. The difference spectral waveform S2 is a difference spectral waveform at a time point $T_1$=201 [sec]. Here, Δt (=$T_2$−$T_1$) when the difference spectral waveforms S1 and S2 were obtained is 5 [sec] in both cases.

The zero-cross wavelength $\lambda_{A11}$ in the figure is one of the plurality of zero-cross wavelengths in the difference spectral waveform S1. In this example, the zero-cross wavelength $\lambda_{A11}$=525.02 [nm]. The zero-cross wavelength $\lambda_{A12}$ in the figure is a zero-cross wavelength adjacent to the zero-cross wavelength $\lambda_{A11}$ out of the plurality of zero-cross wavelengths in the difference spectral waveform S1. In this example, the zero-cross wavelength $\lambda_{A12}$=452.96 [nm]. Here, the "adjacent zero-cross wavelengths" strictly mean zero-cross wavelengths at which slopes of the difference spectral waveform S1 at the wavelengths have the same sign as each other. This is because the wavelengths where the difference spectral waveform S1 crosses a zero axis with the same slope are both wavelengths where interfering light components strengthen each other (or weaken each other).

When the refractive index of the semiconductor film 15 in the vicinity of the wavelength 500 [nm] is provided as n=2.5, m is obtained from the above equation (10).

[Equation 12]

$$m = \frac{\lambda_2}{\lambda_1 - \lambda_2} = \frac{452.96}{525.02 - 452.96} = 6.28 \cong 6 \quad (12)$$

In the difference spectral waveform S2 after 30 seconds, the zero-cross wavelength $\lambda_{A21}$ corresponding to the zero-cross wavelength $\lambda_{A11}$ in the difference spectral waveform S1 has moved to a short wavelength side up to 475.52 [nm]. Based on this, the amount of change Δd in film thickness d can be obtained.

[Equation 13]

$$\Delta d = X \times \frac{m}{2n} = (525.02 - 475.52) \times \frac{6}{2 \times 2.5} = 59.4 [\text{nm}] \quad (13)$$

Figure 7:
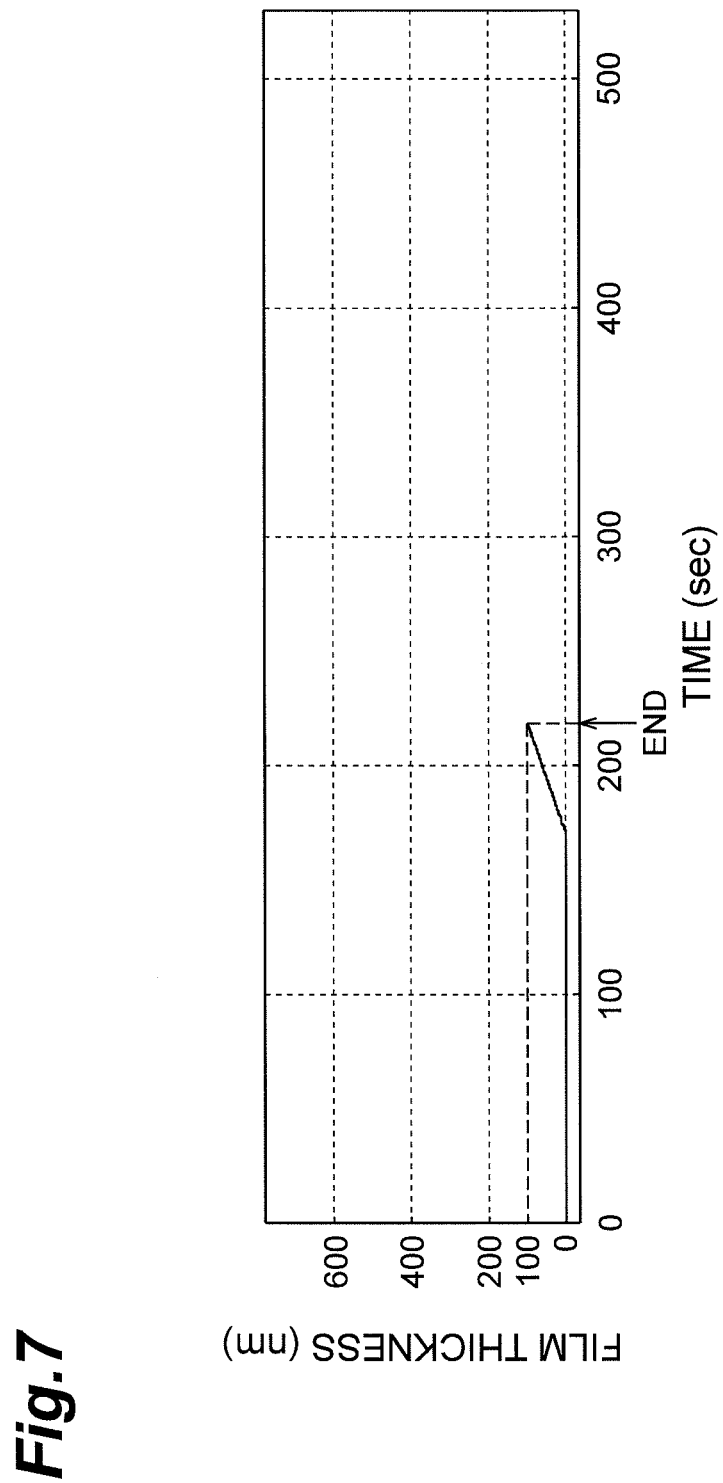
FIG. 7 is a graph showing a relationship between the film thickness d of the semiconductor film 15 in a film forming process and the film forming time.

When an initial film thickness of the semiconductor film 15 before starting a process (film forming process or etching process) is known in advance, by measuring in real time the amount of change Δd in film thickness d thus obtained, the process can be suitably stopped at a time point the semiconductor film 15 has reached a predetermined film thickness. FIG. 7 is a graph showing a relationship between the film thickness d and the film forming time of the semiconductor film 15 in a film forming process. As shown in the figure, the film forming process can be ended at a time point the film has reached a predetermined film thickness d=100 [nm].

Figure 8:
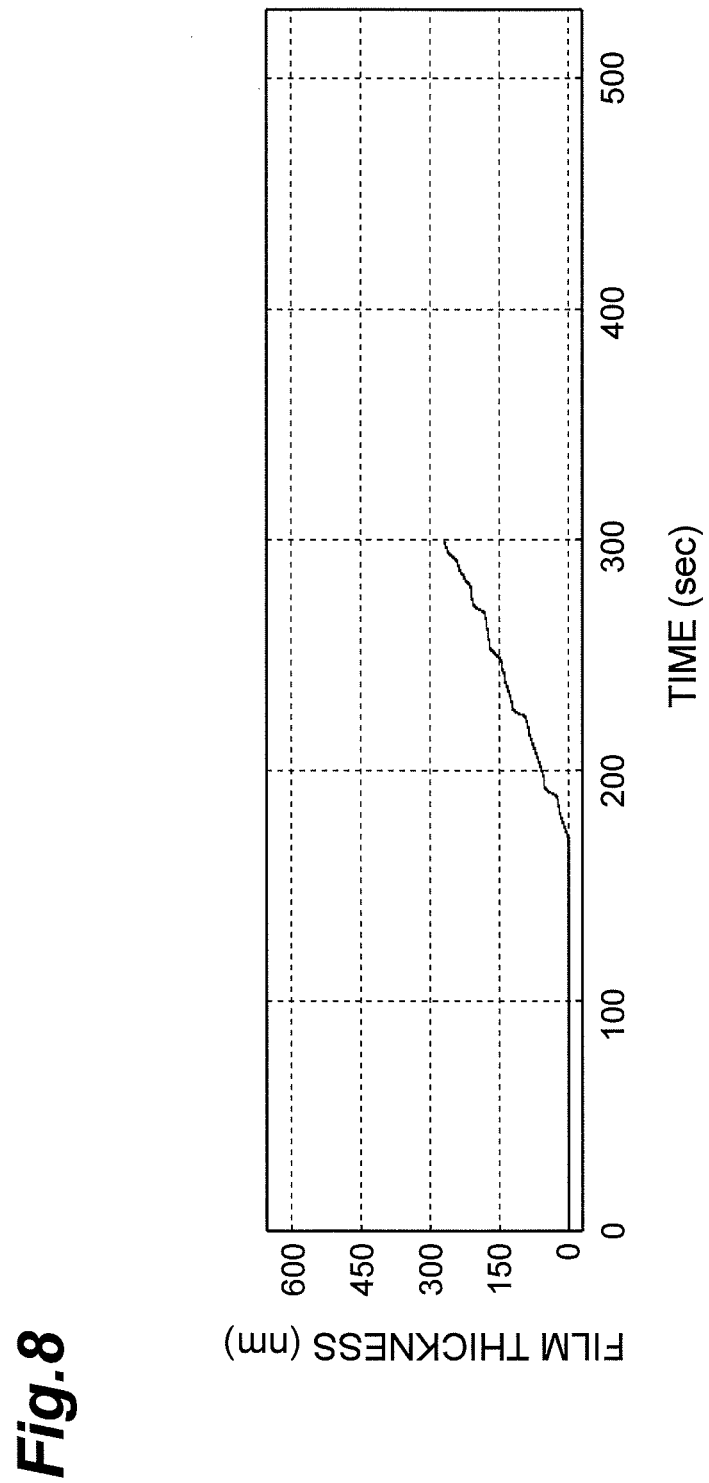
FIG. 8 is a graph showing a measurement result of the film thickness that increases at a constant rate when the measurement wavelength is provided as 400 [nm].
Figure 9:
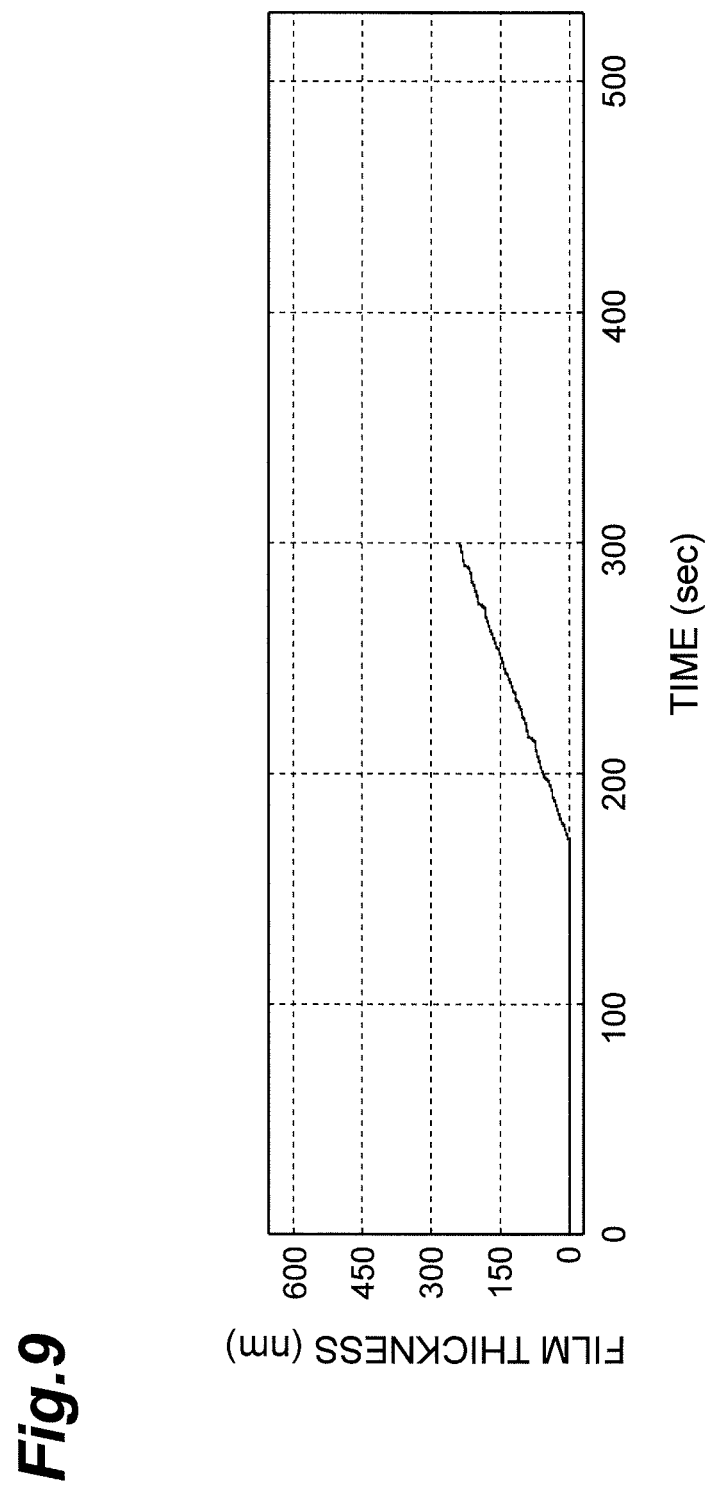
FIG. 9 is a graph showing a measurement result of the film thickness that increases at a constant rate when the measurement wavelength is provided as 600 [nm].
Figure 10:
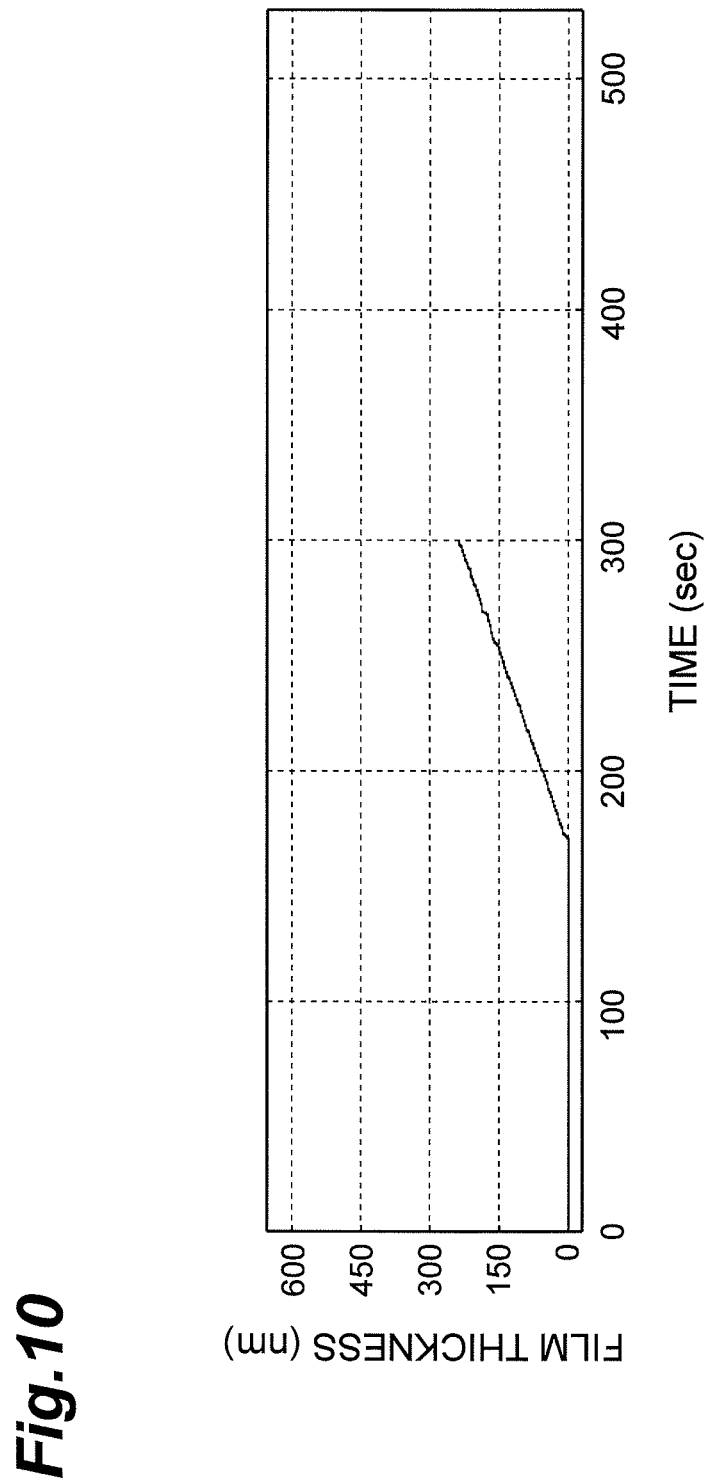
FIG. 10 is a graph showing a measurement result of the film thickness that increases at a constant rate when the measurement wavelength is provided as 800 [nm].

In the above example, a description has been given of a measurement method in the case where the measurement wavelength is in the vicinity of 500 [nm], but measurement light with various wavelengths can be used as appropriate. Here, FIG. 8, FIG. 9, and FIG. 10 are graphs showing measurement results of the film thickness that increases at a constant rate when the measurement wavelengths are provided as 400 [nm], 600 [nm], and 800 [nm], respectively. With reference to FIG. 8, there is variation in the rate of change in film thickness when the measurement wavelength is 400 [nm]. On the other hand, with 800 [nm], the rate of change in film thickness is substantially fixed, so that it can be understood that the film thickness could be measured at high accuracy. Thus, in the above-described film forming method, there is a tendency that the longer the measurement wavelength, the higher the film thickness measurement accuracy becomes. This is considered because the longer the measurement wavelength becomes, the larger the amount of change in interference peak (zero-cross wavelength) becomes in response to a change in film thickness.

Figure 11:
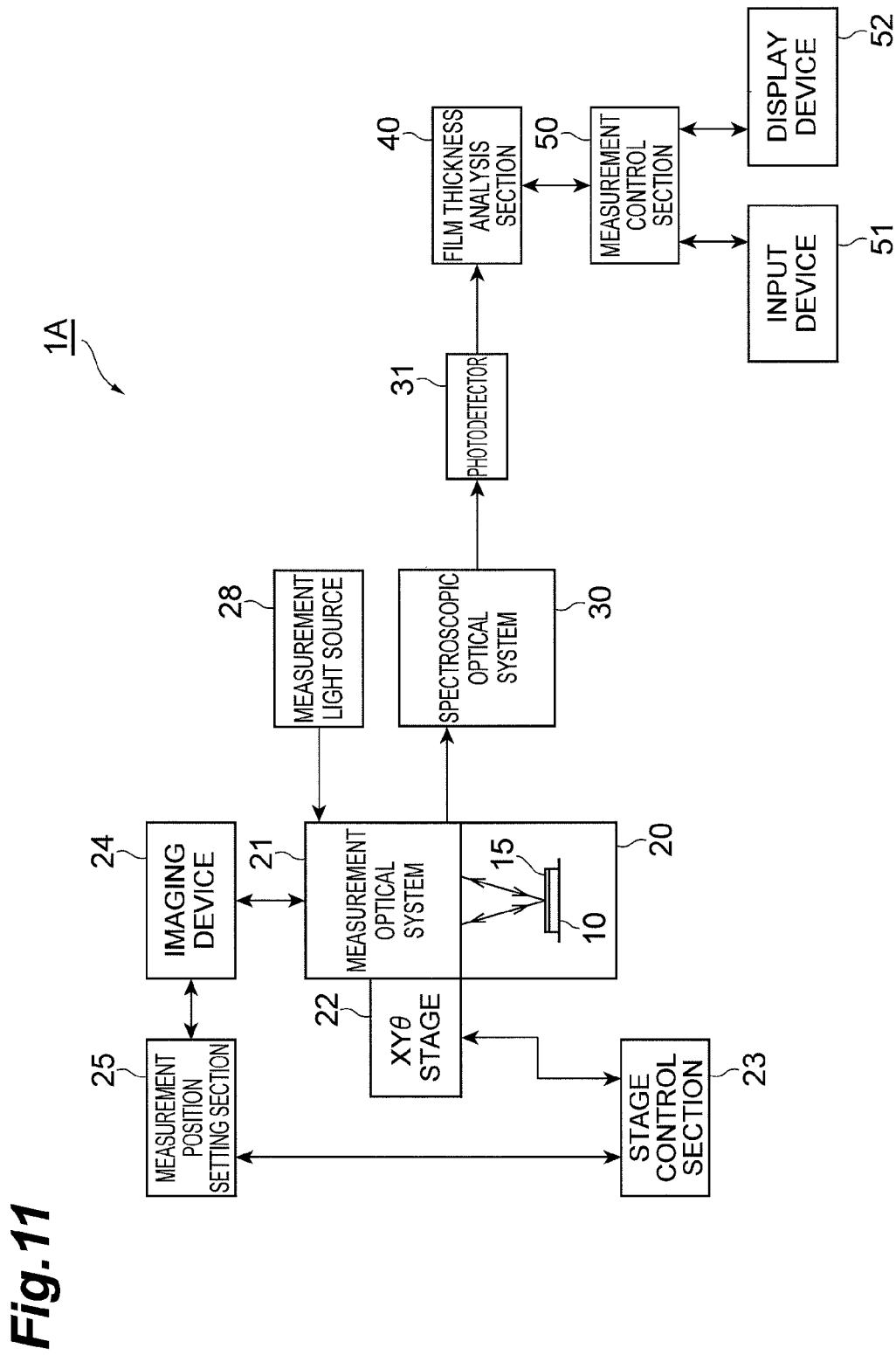
FIG. 11 is a block diagram showing a configuration of an embodiment of a film thickness measurement apparatus.

Next, description will be given of a configuration of a film thickness measurement apparatus which can suitably realize the above-described measurement method. FIG. 11 is a block diagram showing a configuration of an embodiment of a film thickness measurement apparatus. The present embodiment shows an example in which the semiconductor film 15 of the sample 10 (refer to FIG. 1) set inside a processing chamber of a semiconductor processing unit (for example, an etching unit) 20 is used as a measuring object. The film thickness measurement apparatus 1A includes a measurement optical system 21, a measurement light source 28, a spectroscopic optical system 30, a photodetector 31, and a film thickness analysis section 40.

The measurement light source 28 that supplies measurement light L0 to the semiconductor film 15 of the sample 10 inside the processing unit 20 via the measurement optical system 21 is provided. This measurement light source 28 supplies the measurement light L0 containing at least wavelength components over a predetermined band to the semiconductor film 15 as a measuring object. As the measurement light source 28, for example, a white light source that supplies white light in the above-described predetermined band as the measurement light L0 can be suitably used. Alternatively, the measurement light source may be a wavelength variable laser capable of varying its output wavelength over the predetermined band or a combination of a plurality of monochromatic light sources contained in the predetermined band. Because the larger the amount of change in film thickness, the more the peak wavelength (zero-cross wavelength) of the interfering light intensity changes in film thickness measurement by the foregoing method, it is preferable that the width of the predetermined band is set according to the amount of change in film thickness to be measured, and this is preferably, for example, 20 [nm] or more.

Figure 12:
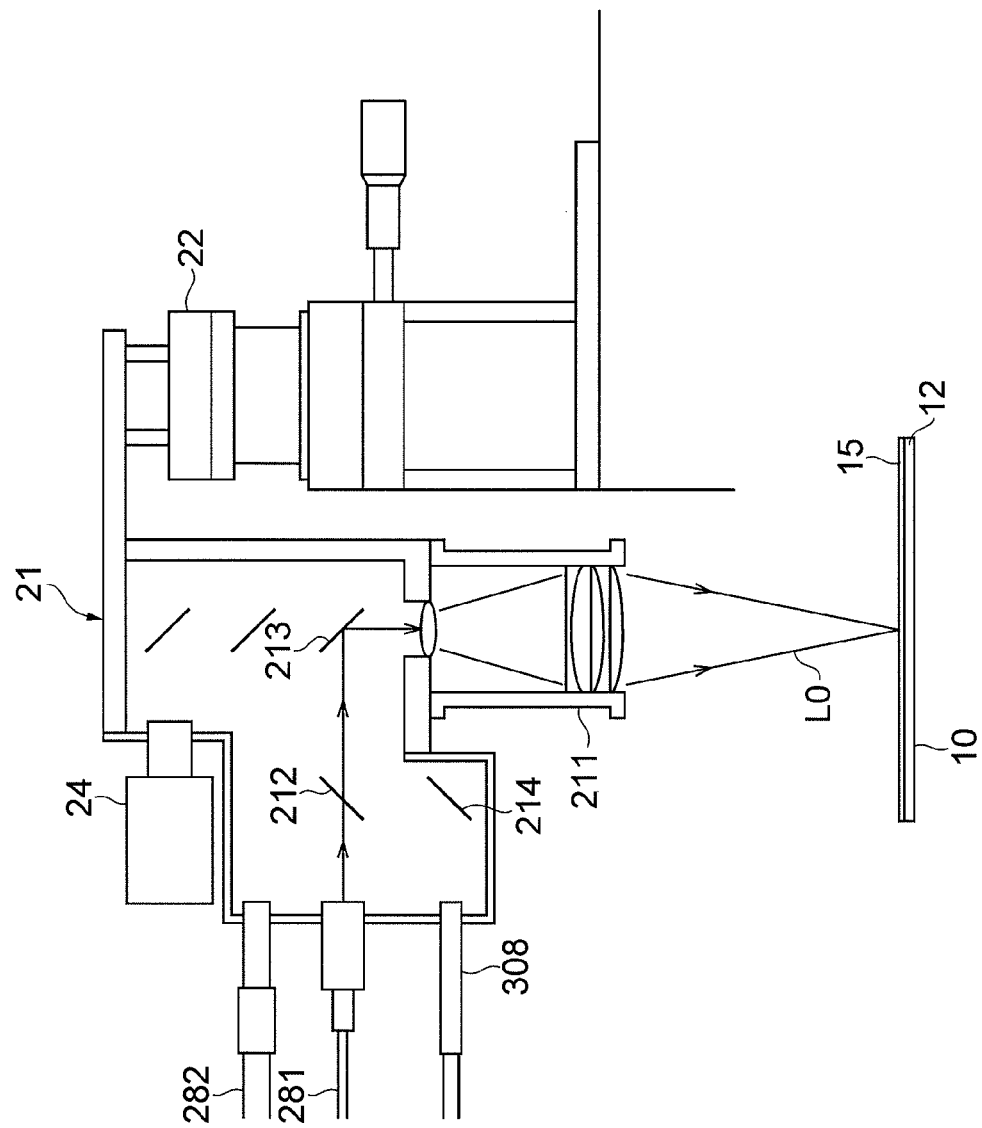
FIG. 12 is a view showing an example of a configuration of a measurement optical system 21 in the film thickness measurement apparatus 1A.
Figure 13:
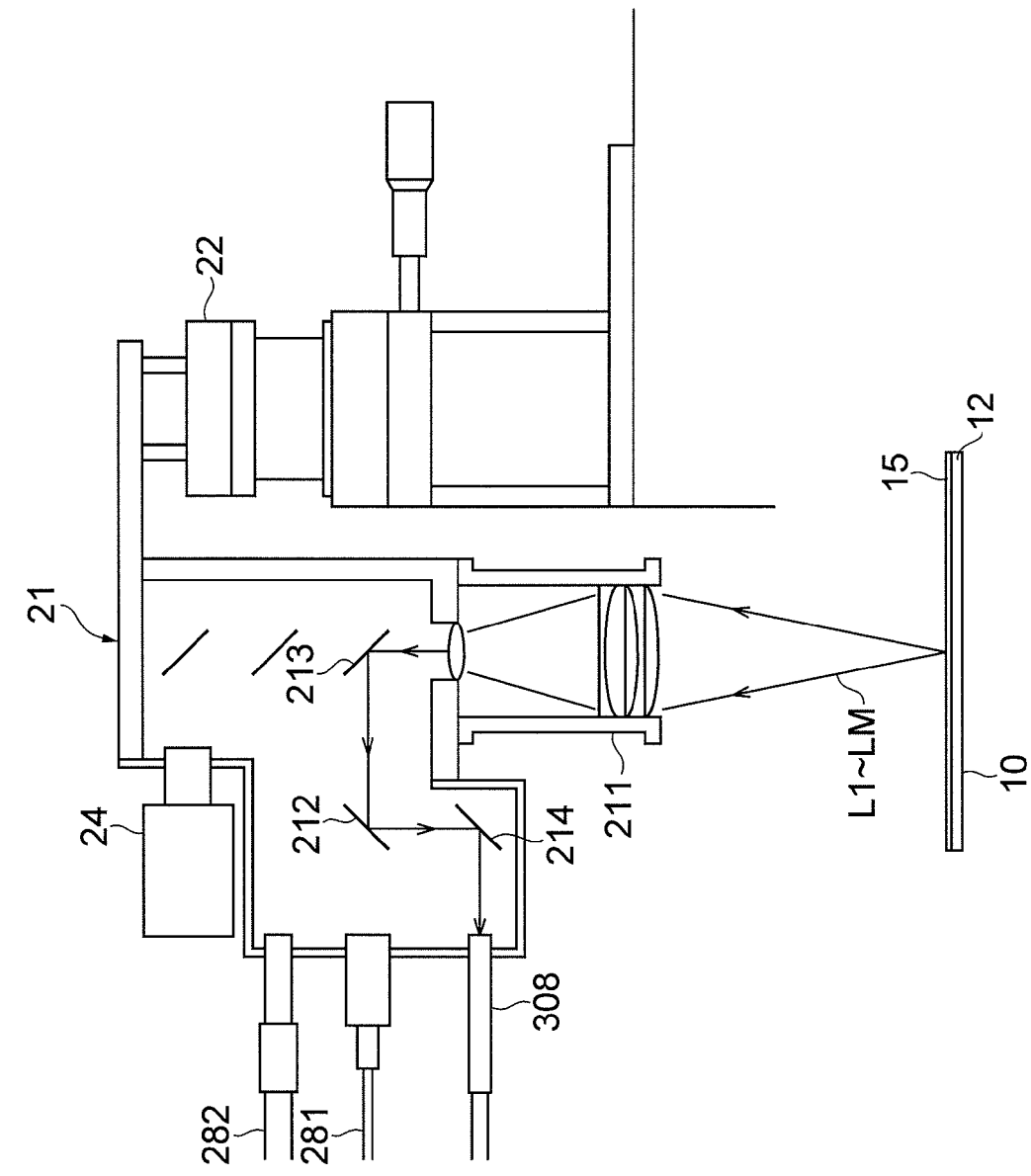
FIG. 13 is a view showing an example of a configuration of a measurement optical system 21 in the film thickness measurement apparatus 1A.

For output light formed by superimposing reflected light components L1 to LM generated by reflection of the measurement light L0 by the sample 10, the spectroscopic optical system 30 and the photodetector 31 are provided via the measurement optical system 21. Here, FIG. 12 and FIG. 13 are views showing an example of a configuration of the measurement optical system 21 in the film thickness measurement apparatus 1A. In this configuration example, for the measurement optical system 21 including an objective lens 211 opposed to the sample 10, a measurement light input fiber 281 that guides the measurement light from the measurement light source 28, an illumination light input fiber 282 that guides illumination light to be used for acquiring an image of the sample 10, etc., and a reflected light output fiber 308 that guides reflected light (output light) from the sample 10 to the spectroscopic optical system 30 are connected.

In this configuration, as shown in FIG. 12, the measurement light L0 from the measurement light source 28 is input into the measurement optical system 21 by the input fiber 281, passes through a half mirror 212, and is reflected by a reflecting mirror 213, and supplied to the semiconductor film 15 of the sample 10 via the objective lens 211. As shown in FIG. 13, output light formed by superimposing reflected light components L1 to LM from the upper surface and the lower surface of the semiconductor film 15 are reflected by the reflecting mirror 213, the half mirror 212, and the reflecting mirror 214, and output to the spectroscopic optical system 30 via the output fiber 308.

The spectroscopic optical system 30 is spectroscopic means that disperses the reflected light input from the sample 10 via the measurement optical system 21, and forms a part of the detection means in the present embodiment. In detail, the spectroscopic optical system 30 decomposes output light of the measurement light L0 from the semiconductor film 15 so as to be detectable at respective wavelengths.

Figure 14:
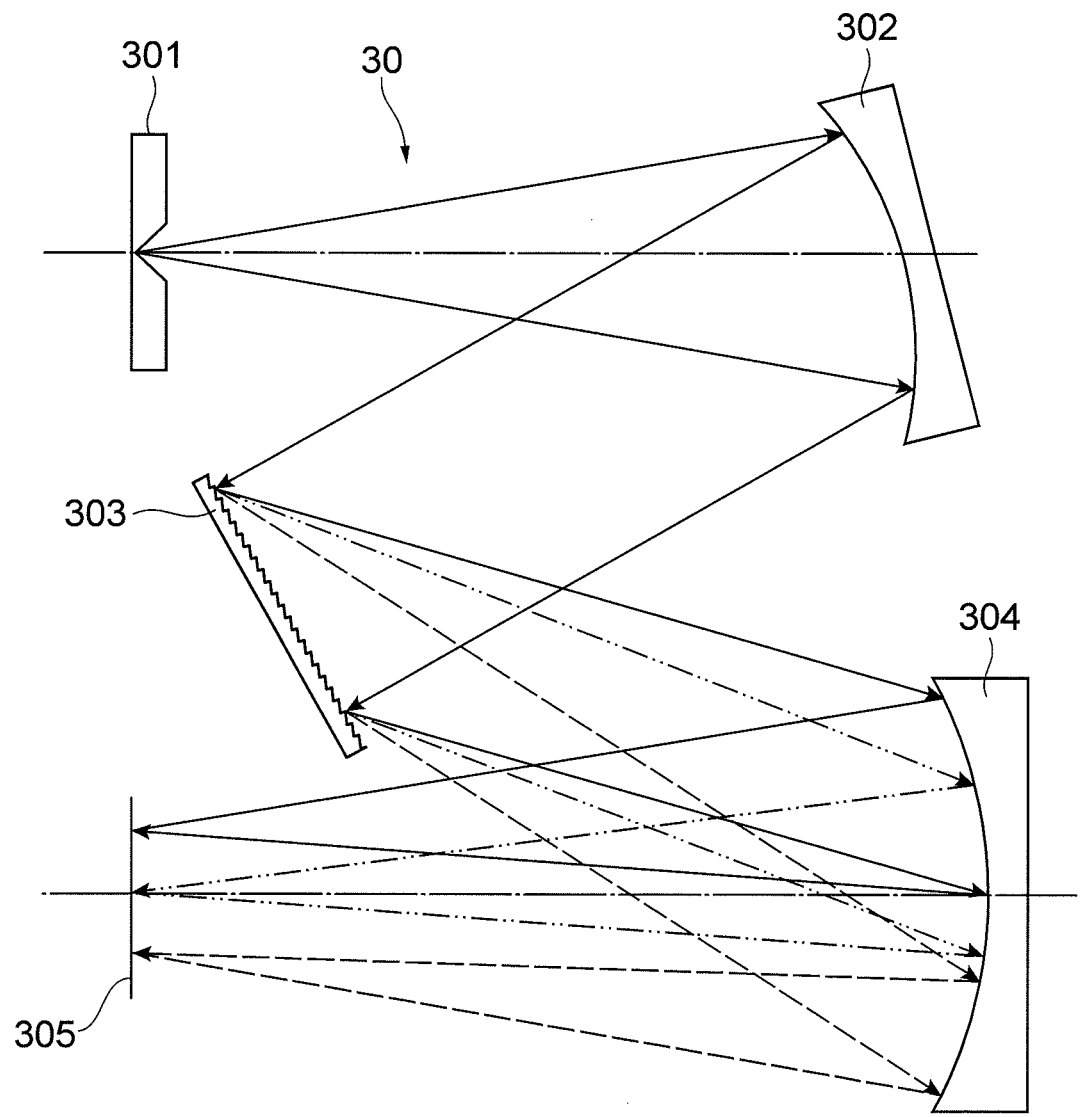
FIG. 14 is a view showing an example of a configuration of a spectroscopic optical system 30.

FIG. 14 is a view showing an example of a configuration of the spectroscopic optical system 30. The spectroscopic optical system 30 includes an entrance slit 301, a collimating optical system 302, a diffraction grating 303 as a dispersion element, and a focusing optical system 304. In this configuration, the output light decomposed into respective wavelength components by the diffraction grating 303 is imaged by wavelength component on a wavelength spectrum output plane 305 via the focusing optical system 304, and detected as respective wavelength components by the photodetector disposed at the output plane 305. In addition, for example, by using a band-pass filter, a spectroscopic optical system that decomposes output light from the semiconductor film 15 so as to be detectable by wavelength can be suitably configured as well as this example.

As detection means for detecting intensities at each time point t respectively of the wavelength components of the output light decomposed by wavelength component by the spectroscopic optical system 30, a photodetector 31 shown in FIG. 11 is provided. The photodetector 31 consists of, for example, a multi-channel photodetector disposed at the output plane 305 of the spectroscopic optical system 30 shown in FIG. 14 and including a plurality of photodetection elements aligned for detecting intensities of the wavelength components decomposed by the spectroscopic optical system 30.

A detection signal output from the photodetector 31 is provided for the film thickness analysis section 40. The film thickness analysis section 40, which is film thickness analysis means that obtains a temporal change in film thickness d of the semiconductor film 15 as a measuring object, obtains a peak wavelength where the intensity of interfering light generated by the reflected light components L1 to LM (particularly, L1 to L2) from the semiconductor film 15 interfering with each other is maximized or minimized based on spectral waveforms of output light detected at two or more time points different from each other, and obtains a temporal change in film thickness d of the semiconductor film 15 from a temporal change in peak wavelength.

In detail, as previously described, by obtaining a difference $I(t+\Delta t, \lambda) - I(t, \lambda)$ between a first spectral waveform $I(t, \lambda)$ of output light detected at a first time point $T_1 = t$ and a second spectral waveform $I(t+\Delta t, \lambda)$ of output light detected at a second time point $T_2 = t + \Delta t$ different from the first time point $T_1$, and more preferably normalizing the difference, and obtaining its zero-cross wavelength, a peak wavelength of an interfering light spectrum is obtained. Then, a temporal change in film thickness d is obtained by the foregoing equation (11). The film thickness analysis section 40 stores in advance end point information regarding the film thickness d, and outputs a signal (end point detection signal) indicating that the process has reached an end point when the calculated film thickness d has reached a predetermined thickness. The film thickness analysis section 40 may consist of, for example, a computer on which a predetermined analysis program is executed.

In the film thickness measurement apparatus 1A shown in FIG. 11, a measurement control section 50 is provided in addition to the above-described film thickness analysis section 40. The measurement control section 50 performs necessary control for a film thickness measuring operation in the measurement apparatus 1A and an operation of an etching process in the processing unit 20, etc., by controlling the respective sections of the measurement apparatus 1A and the processing unit 20 by referring to film thickness information and end point information output from the film thickness analysis section 40.

To this measurement control section 50, an input device 51 and a display device 52 are connected. The input device 51 is used to input information, conditions, and instructions, etc., by an operator, necessary for measurement operations in the measurement apparatus 1A and processing operations in the processing unit 20. This input device 51 can be used to input, for example, a measurement wavelength to be used in the film thickness analysis section 40, a refractive index of the semiconductor film 15, and a target film thickness of the process, and the like. The input device may allow further input of a film thickness value when starting the process. However, it is also possible that these conditions and values are prepared in advance in the film thickness analysis section 40. The display device 52 is used to display information necessary for the above-described measurement operations and processing operations to an operator.

In the film thickness measurement apparatus 1A of the present embodiment, for the measurement optical system 21, an XYθ stage 22 is provided. The XYθ stage 22 is used to adjust the measurement position and measurement conditions for the film thickness d on the semiconductor film 15 by the film thickness measurement apparatus 1A, by adjusting the position and angle, etc., of the measurement optical system 21 in the X direction, Y direction, and θ direction. Further, driving of the XYθ stage 22 is controlled by a stage control section 23.

For the sample 10 inside the processing unit 20 and the measurement optical system 21, an imaging device 24 and a measurement position setting section 25 are further provided. The imaging device 24 is a position confirmation imaging device for confirming a measurement position of the film thickness d on the semiconductor film 15 by the film thickness measurement apparatus 1A. The measurement position setting section 25 sets a film thickness measurement position for the sample 10 by referring to an image of the sample 10 including the semiconductor film 15 acquired by the imaging device 24 via the measurement optical system 21.

Figure 15:
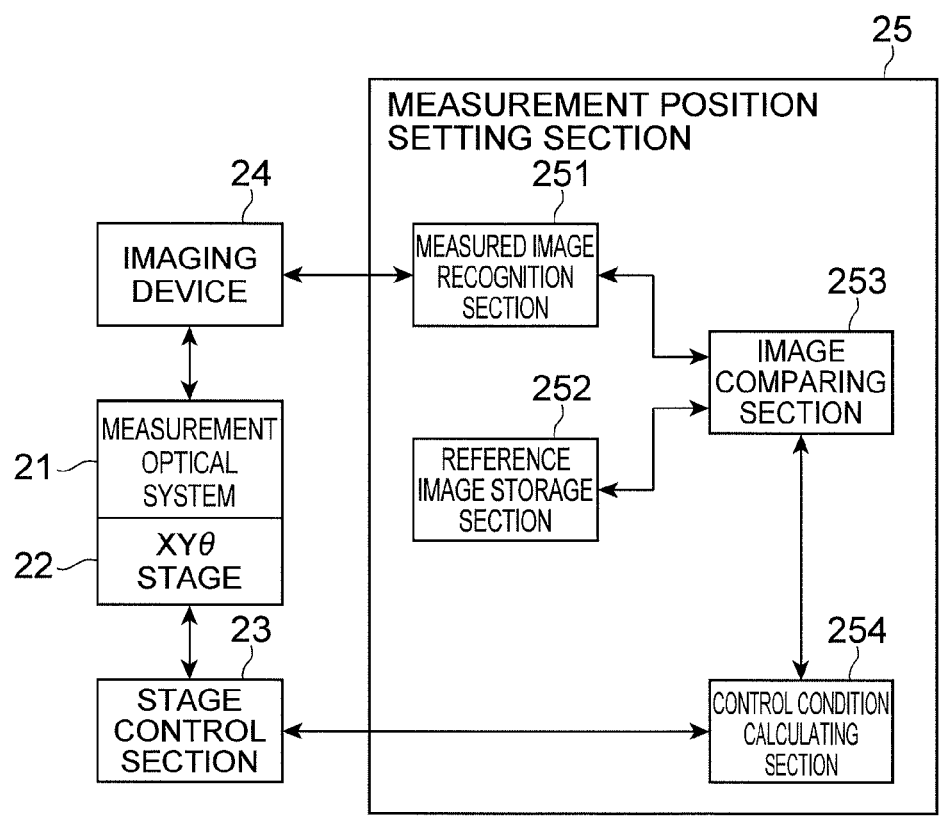
FIG. 15 is a block diagram showing an example of a configuration of a measurement position setting section 25.

FIG. 15 is a block diagram showing an example of a configuration of the measurement position setting section 25. The measurement position setting section 25 according to this configuration example includes a measured image recognition section 251, a reference image storage section 252, an image comparing section 253, and a control condition calculating section 254. The measured image recognition section 251 inputs image data of the sample 10 acquired by the imaging device 24, and performs pattern recognition of the measured pattern in the image. In the reference image storage section 252, a reference image for identifying a position that should be set as a measurement position of the film thickness d on the semiconductor film 15 is stored in advance.

The image comparing section 253 compares a measured pattern in the measured image recognized by the recognition section 251 with a reference pattern in the reference image stored in the storage section 252 according to a method such as calculation of a difference image. Based on the result of comparison between the measured image and the reference image in the image comparing section 253, the control condition calculating section 254 determines whether the measurement position needs to be adjusted, and when it needs to be adjusted, calculates the control conditions. Then, based on control conditions obtained by the calculating section 254, driving of the XYθ stage 22 and the measurement optical system 21 is controlled via the stage control section 23, and accordingly, the measurement position and measurement conditions of the film thickness d for the semiconductor film 15 of the sample 10 are set and controlled.

The measurement position of the film thickness d for the semiconductor film 15 of the sample 10 is preferably set at a position of TEG on the semiconductor wafer. The reason for this is because if the measurement position is set at a position on a semiconductor chip, a level difference, etc., caused by a mask, etc., may influence it and the film thickness d may not be accurately measured.

Effects of the film thickness measurement apparatus and the film thickness measurement method according to the present embodiment will be described.

In the film thickness measurement apparatus 1A and the film thickness measurement method, measurement light L0 including wavelength components over a predetermined band is supplied to the semiconductor film 15 on the substrate 12 as a film-shaped measuring object, and output light containing reflected light components L1 to LM from the upper surface 16 and the lower surface 17 is dispersed and detected by the spectroscopic optical system 30 and the photodetector 31. Then, a peak wavelength where the intensity of interfering light generated by the reflected light components L1 to LM (particularly, L1 to L2) interfering with each other is maximized or minimized is obtained based on spectral waveforms $I(t, \lambda)$, $I(t+\Delta t, \lambda)$ of output light respectively detected at mutually different times $T_1=t$, $T_2=t+\Delta t$, and a temporal change in film thickness d of the semiconductor film 15 is obtained from a temporal change in peak wavelength.

As described above, when the semiconductor film 15 is irradiated with measurement light containing wavelength components over a wide band, its reflected light (output light) spectrum contains, together with interfering light, unnecessary peaks such as a bright line spectrum that had been contained in the measurement light. However, because a center wavelength of such an unnecessary peak caused by the measurement light source remains unchanged irrespective of a change in film thickness d of the semiconductor film 15, a center wavelength of the unnecessary peak also remains unchanged in the spectral waveforms $I(t, \lambda)$, $I(t+\Delta t, \lambda)$ of output light at different times.

Therefore, by using these spectral waveforms $I(t, \lambda)$, $I(t+\Delta t, \lambda)$, the influence of a bright line spectrum, etc., can be canceled to accurately obtain a peak wavelength of the interfering light. Specifically, by the film thickness measurement apparatus 1A and the film thickness measurement method according to the present embodiment, even with such a minute amount of change in film thickness d as to be less than a repetition period $\Delta t_1$ (refer to FIG. 2) of peaks in the interfering light intensity I, the amount of change in film thickness d can be accurately measured without using a reference sample.

As in the present embodiment, for the film thickness measurement apparatus 1A and the film thickness measurement method, it is preferable to calculate a difference $I(t+\Delta t, \lambda)-I(t, \lambda)$ between a first spectral waveform $I(t, \lambda)$ and a second spectral waveform $I(t+\Delta t, \lambda)$, and determine a wavelength $\lambda_A$ where the difference becomes zero as the peak wavelength in the film thickness analysis section 40 (film thickness analysis step).

Because a center wavelength of an unnecessary peak such as a bright line spectrum caused by the measurement light source 28 remains unchanged irrespective of a change in film thickness d of the semiconductor film 15, the first and second spectral waveforms $I(t, \lambda)$, $I(t+\Delta t, \lambda)$ are the same in the center wavelength of a bright line spectrum, etc., contained therein, and its influence can be effectively eliminated by calculating a difference $I(t+\Delta t, \lambda)-I(t, \lambda)$. The zero-cross wavelength $\lambda_A$ where the above-described difference becomes zero is located between mutually corresponding peak wavelengths in the waveforms I(t, λ), I(t+Δt, λ), and this zero-cross wavelength $\lambda_A$ can be regarded as a peak wavelength of the interfering light when Δt is not long. Therefore, from the amount of change in the zero-cross wavelength $\lambda_A$ (for example, $\lambda_{A21} - \lambda_{A11}$ shown in FIG. 6), a temporal change in film thickness d of the semiconductor film 15 can be accurately obtained.

When obtaining a temporal change in film thickness d of the semiconductor film 15 regarding a wavelength where the difference I(t+Δt, λ)−I(t, λ) becomes zero as the peak wavelength, as in the present embodiment, it is preferable to normalize the difference by use of a waveform I(t, λ)+I(t+Δt, λ) for which the first spectral waveform I(t, λ) and the second spectral waveform I(t+Δt, λ) are superimposed (refer to the above equation (6)), and then determine the peak wavelength in the film thickness analysis section 40 (film thickness analysis step). Accordingly, even when the size of the difference I(t+Δt, λ)−I(t, λ) greatly varies depending on the wavelength because the intensity of the measurement light L0 varies depending on the wavelength as shown in FIG. 4, a favorable spectral waveform regarding the difference I(t+Δt, λ)−I(t, λ) can be obtained, as shown in FIG. 5.

A specific measuring object of film thickness measurement may be, as described above, the semiconductor film 15 on the substrate 12, and preferably, a temporal change of the film thickness d of the semiconductor film 15 is measured during execution of a predetermined process. In this configuration, during execution of a semiconductor process such as an etching process or a thin-film formation process, etc., which causes the film thickness d of the semiconductor film 15 to decrease or increase, process control such as detection of an end point of the process can be accurately performed. Further, the film thickness measurement method according to the present embodiment is generally applicable to measurement of the amount of change in film thickness d of a film-shaped measuring object as well as the semiconductor film 15.

(Second Embodiment)

Subsequently, a second embodiment of a film thickness measurement apparatus and a film thickness measurement method according to the present invention will be described. There is a difference between the first embodiment described above and the present embodiment in the process content in the film thickness analysis means (film thickness analysis step). Specifically, the present embodiment is the same as the first embodiment, in the film thickness analysis means (film thickness analysis step), of detecting output light at two or more time points different from each other, and obtaining a peak wavelength where the interfering light intensity I is maximized or minimized based on respective spectral waveforms of those output light components, but is different in its specific method. The apparatus configuration and steps other than the film thickness analysis means (film thickness analysis step) are the same as those of the first embodiment.

In the present embodiment, by obtaining a wavelength λ where a ratio I(t+Δt, λ)/I(t, λ) of a first spectral waveform I(t, λ) of output light detected at a first time point $T_1$=t and a second spectral waveform I(t+Δt, λ) of output light detected at a second time point $T_2$=t+Δt different from the first time point $T_1$ becomes 1, a peak wavelength of an interfering light spectrum is obtained. When the ratio of the first and second spectral waveforms becomes one is specifically when the first and second spectral waveforms are equalized, which is equivalent to when the difference I(t+Δt, λ)−I(t, λ) becomes zero in the first embodiment, and thus a peak wavelength of an interfering light spectrum can be suitably obtained also by such calculation.

Figure 16:
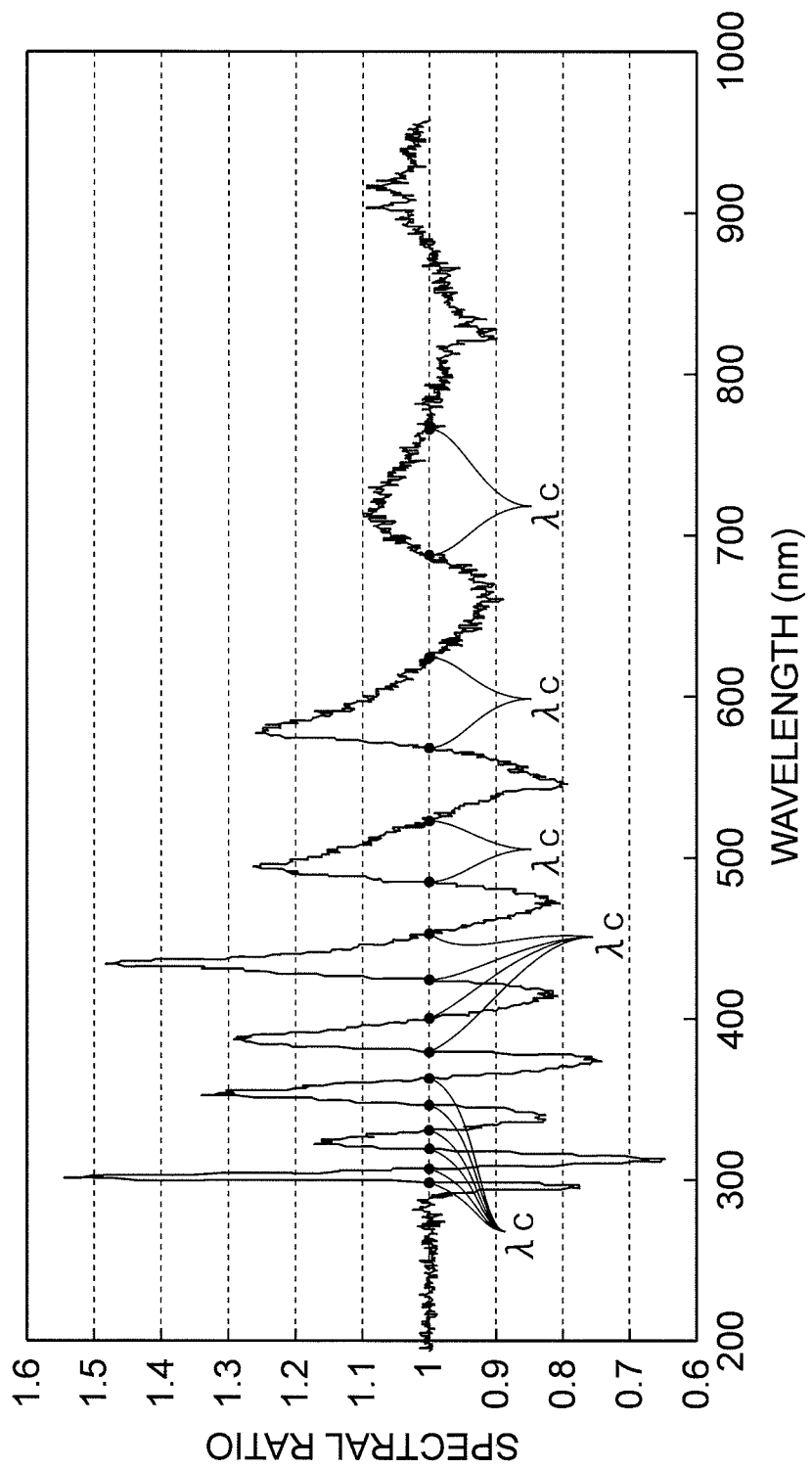
FIG. 16 is a graph showing an example of a ratio $I(t+\Delta t, \lambda)/I(t, \lambda)$ when $t=171$ [sec] and $\Delta t=5$ [sec].

FIG. 16 is a graph showing an example of a ratio I(t+Δt, λ)/I(t, λ) when t=171 [sec] and Δt=5 [sec]. In FIG. 16, spectral components other than interfering light, such as a bright line spectrum that had been contained in measurement light L0, are fixed irrespective of a temporal change in film thickness d, and are thus canceled. Also in FIG. 16, because Δt is 5 [sec], which is small, a wavelength (wavelength $\lambda_C$ in the figure) where the ratio I(t+Δt, λ)/I(t, λ) becomes 1 can be regarded as a peak wavelength of the interfering light spectrum. Here, if Δt is not more than 10 [sec], a wavelength $\lambda_C$ where the ratio I(t+Δt, λ)/I(t, λ) becomes one can be regarded in this way as a peak wavelength of an interfering light spectrum.

Based on equation (2), when the film thickness d of the semiconductor film 15 changes, the peak wavelength of the interfering light spectrum changes. Therefore, by measuring a movement amount of the peak wavelength, the amount of change in film thickness d can be known from equation (11).

Also in the present embodiment, a peak wavelength where the intensity of interfering light generated by the reflected light components L1 to LM (particularly, L1 to L2) interfering with each other is maximized or minimized is obtained based on spectral waveforms I(t, λ), I(t+Δt, λ) of output light detected at mutually different times $T_1$=t, $T_2$=t+Δt, and a temporal change in film thickness d of the semiconductor film 15 is obtained from a temporal change in peak wavelength. Therefore, the influence of a bright light spectrum, etc., can be canceled to accurately obtain a peak wavelength of the interfering light, and thus even with such a minute amount of change in film thickness d as to be less than a repetition period $\Delta t_1$ (refer to FIG. 2) of peaks in the interfering light intensity I, the amount of change in film thickness d can be accurately measured without using a reference sample.

Further, as in the present embodiment, for the film thickness measurement apparatus 1A and the film thickness measurement method, it may be possible to calculate a ratio I(t+Δt, λ)/I(t, λ) of a first spectral waveform I(t, λ) and a second spectral waveform I(t+Δt, λ), and determine a wavelength $\lambda_C$ where the ratio becomes 1 as the peak wavelength in the film thickness analysis means (film thickness analysis step). Because a center wavelength of an unnecessary peak such as a bright line spectrum caused by the measurement light source remains unchanged irrespective of a change in film thickness d of the semiconductor film 15, its influence can be effectively eliminated by calculating a ratio I(t+Δt, λ)/I(t, λ). The wavelength $\lambda_C$ where the ratio becomes 1 is located between mutually corresponding peak wavelengths in the waveforms I(t, λ), I(t+Δt, λ), and this wavelength $\lambda_C$ can be regarded as a peak wavelength of the interfering light when Δt is not long. Therefore, from the amount of change in the wavelength $\lambda_C$, a temporal change in film thickness d of the semiconductor film 15 can be accurately obtained.

(Third Embodiment)

Subsequently, a third embodiment of a film thickness measurement apparatus and a film thickness measurement method according to the present invention will be described. There is a difference between the first embodiment described above and the present embodiment in the process content in the film thickness analysis means (film thickness analysis step). The apparatus configuration and steps other than the film thickness analysis means (film thickness analysis step), in the present embodiment, are the same as those of the first embodiment.

In equation (2) described above, when it is assumed that the refractive index n is fixed with respect to the wavelength λ, a spectral waveform of interfering light from the semiconductor film 15 is a periodic waveform according to the film thickness d of the semiconductor film 15. The thinner the film thickness d of the semiconductor film 15, the larger its period (interval of adjacent peak wavelengths) becomes, and conversely, the thicker the film thickness d of the semiconductor film 15, the smaller its period becomes. In other words, the thinner the film thickness d of the semiconductor film 15, the smaller the number of repetitions in a spectral waveform of interfering light per unit wavelength becomes, and conversely, the thicker the film thickness d of the semiconductor film 15, the larger the number of repetitions in a spectral waveform of interfering light per unit wavelength becomes.

The number of repetitions per unit wavelength is obtained by a Fourier transform (preferably, a fast Fourier transform (FFT: Fast Fourier Transform)) of an output light spectrum with respect to wavelength. Then, as described above, the number of repetitions of a spectral waveform of interfering light obtained by the FFT changes according to the film thickness d, and thus the amount of change in film thickness d can be obtained based on the change in the number of repetitions.

In the present embodiment, output light is detected at two or more time points different from each other in the film thickness analysis means (film thickness analysis step). Then, based on respective spectral waveforms of the output light, the number of repetitions of a spectral waveform of interfering light per unit wavelength is obtained as a value corresponding to a wavelength interval of peak wavelengths where the interfering light intensity I is maximized or minimized, and a temporal change in film thickness d of the semiconductor film 15 is obtained from a temporal change in the number of repetitions.

In detail, a Fourier transform (preferably, a fast Fourier transform) that uses wavelength as an independent variable is performed for a first spectral waveform $I(t, \lambda)$ regarding output light detected at a first time point $T_1$ to obtain a first Fourier-transformed waveform $F\{I(t, \lambda)\}$. Similarly, a Fourier transform that uses wavelength as a variable is performed also for a second spectral waveform $I(t+\Delta t, \lambda)$ regarding output light detected at a second time point $T_2$ different from the first time point $T_1$ to obtain a second Fourier-transformed waveform $F\{I(t+\Delta t, \lambda)\}$.

Figure 17:
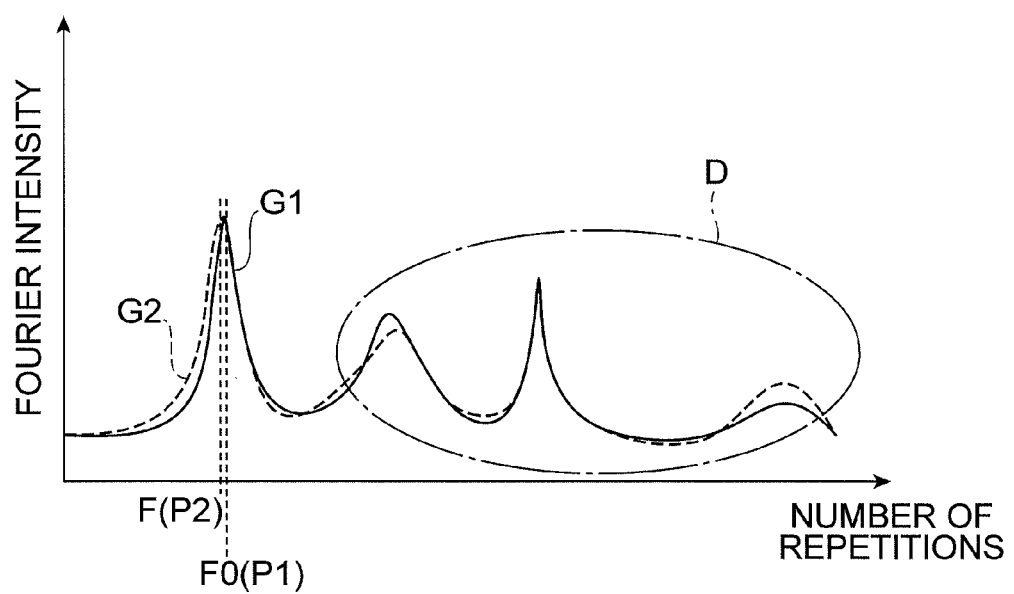
FIG. 17 includes graphs each showing an example of a Fourier-transformed waveform, in which graph G1 shows a first Fourier-transformed waveform $F\{I(t, \lambda)\}$, and graph G2 shows a second Fourier-transformed waveform $F\{I(t+\Delta t, \lambda)\}$.

FIG. 17 is a graph showing an example of each Fourier-transformed waveform, in which graph G1 shows a first Fourier-transformed waveform $F\{I(t, \lambda)\}$, and graph G2 shows a second Fourier-transformed waveform $F\{I(t+\Delta t, \lambda)\}$. Further, center F0 of peak P1 shown in FIG. 17 corresponds to the number of repetitions per unit wavelength of interfering light contained in the first spectral waveform $I(t, \lambda)$, and center F of peak P2 corresponds to the number of repetitions per unit wavelength of interfering light contained in the second spectral waveform $I(t+\Delta t, \lambda)$. The peaks (for example, peaks present in region D of the figure) other than peaks P1, P2 in FIG. 17 are peaks due to bright lines, etc., and are components not related to interfering light.

In the example shown in FIG. 17, a difference between center F0 of peak P1 and center F of peak P2 is specifically the amount of change in the number of repetitions of a spectral waveform of interfering light per unit wavelength, and thus based on this difference (F0−F), the amount of change in film thickness d of the semiconductor film 15 can be obtained in the following manner.

Specifically, the FFT is a discrete Fourier transform, and one period of an interfering light spectrum before a Fourier transform serves as a fundamental wave, and thus when the wavelength range of the fundamental wave is $\lambda_1$–$\lambda_2$ and the film thickness corresponding to the fundamental wave of the FFT is $D_0$, there is a relationship of the following equation (14).

[Equation 14]

$$\frac{2nD_0}{\lambda_1} - \frac{2nD_0}{\lambda_2} = 1 \tag{14}$$

By solving the above equation (14) for $D_0$,

[Equation 15]

$$D_0 = \frac{\lambda_1 \lambda_2}{2n|\lambda_1 - \lambda_2|} \tag{15}$$

is obtained. Here, when the number of repetitions per unit wavelength of interfering light corresponding to peak P1 in FIG. 17 is F0, and the number of repetitions per unit wavelength of interfering light corresponding to peak P2 is F, the amount of change in film thickness $\Delta d$ can be obtained by the following equation (16).

[Equation 16]

$$\Delta d = D_0 |F - F_0| = \frac{\lambda_1 \lambda_2}{2n|\lambda_1 - \lambda_2|} |F - F0| \tag{16}$$

Figure 18:
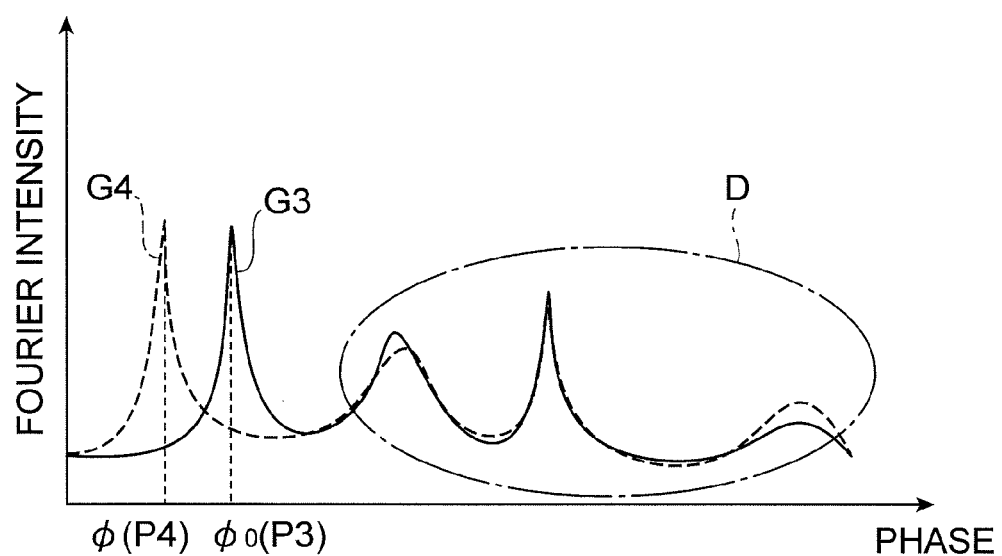
FIG. 18 includes graphs of Fourier-transformed waveforms whose horizontal axis is converted into phase, in which graph G3 shows a first Fourier-transformed waveform $\phi\{F(t, \lambda)\}$, and graph G4 shows a second Fourier-transformed waveform $\phi\{F(t+\Delta t, \lambda)\}$.

When the amount of change in film thickness $\Delta d$ is minute, the amount of change in film thickness $\Delta d$ is expressed more highly accurately by a temporal change in phase than by a temporal change in the number of repetitions F, and thus by calculating the amount of change in film thickness $\Delta d$ based on the temporal change in phase, the amount of change in film thickness $\Delta d$ can be calculated with higher accuracy. FIG. 18 is a graph of Fourier-transformed waveforms whose horizontal axis is converted into phase, in which graph G3 shows a first Fourier-transformed waveform $\phi\{F(t, \lambda)\}$, and graph G4 shows a second Fourier-transformed waveform $\phi\{F(t+\Delta t, \lambda)\}$. Further, center $\phi_0$ of peak P3 shown in FIG. 18 is a phase corresponding to the number of repetitions per unit wavelength of interfering light contained in the first spectral waveform $I(t, \lambda)$, and center $\phi$ of peak P4 is a phase corresponding to the number of repetitions per unit wavelength of interfering light contained in the second spectral waveform $I(t+\Delta t, \lambda)$.

Also in FIG. 18, the peaks (peaks present in region D of the figure) other than peaks P3, P4 are peaks due to bright lines, etc., and are components not related to interfering light. The phases $\phi_0$ and $\phi$ can be obtained by the following equation (17) and equation (18).

[Equation 17]

$$F = \sqrt{(\text{imaginary part})^2 + (\text{real part})^2} \tag{17}$$

[Equation 18]

$$\phi = \arctan\left(\frac{\text{imaginary part}}{\text{real part}}\right) \tag{18}$$

Hence, the amount of change $\Delta d$ in film thickness can be obtained by the following equation (19).

[Equation 19]

$$\Delta d = D_0 \frac{|\phi - \phi_0|}{2\pi} = \frac{\lambda_1 \lambda_2}{4\pi n |\lambda_1 - \lambda_2|} |\phi - \phi_0| \qquad (19)$$

In the present embodiment, the number of repetitions per unit wavelength of a spectral waveform of interfering light generated by the reflected light components L1 to LM (particularly, L1 to L2) interfering with each other is obtained based on spectral waveforms $I(t, \lambda)$, $I(t+\Delta t, \lambda)$ of output light detected at mutually different times $T_1=t$, $T_2=t+\Delta t$, and a temporal change in film thickness d of the semiconductor film 15 is obtained from a temporal change (F0−F) in the number of repetitions. Further, a phase of the number of repetitions is determined, and a temporal change in film thickness d of the semiconductor film 15 is obtained from a temporal change ($\phi_0-\phi$) in the phase. Therefore, the influence of a bright line spectrum, etc., present, for example, in region D of FIG. 17 and FIG. 18 can be canceled to accurately obtain a value corresponding to an interval of peak wavelengths of an interfering light spectrum, and thus even with such a minute change in film thickness as to be less than a repetition period $\Delta t_1$ (refer to FIG. 2) of peaks in the interfering light intensity I, the amount of change in film thickness d can be accurately measured without using a reference sample.

The first spectral waveform $I(t, \lambda)$ and the second spectral waveform $I(t+\Delta t, \lambda)$ are the same in the waveform of a bright line spectrum, etc., contained in the waveforms $I(t, \lambda)$, $I(t+\Delta t, \lambda)$. Therefore, the waveform of a bright line spectrum, etc., is the same also in the waveforms after a Fourier transform $F\{I(t, \lambda)\}$, $F\{I(t+\Delta t, \lambda)\}$ and their phases $\phi\{F(t, \lambda)\}$, $\phi\{F(t+\Delta t, \lambda)\}$, and according to the film thickness measurement apparatus and the film thickness measurement method of the present embodiment, its influence can be suitably eliminated.

According to the film thickness measurement apparatus and the film thickness measurement method, even when measurement light output from the measurement light source 28 does not have a flat spectrum, it suffices to calculate only the number of repetitions corresponding to the film thickness d of the semiconductor film 15, and the influence of the spectrum of measurement light can be substantially disregarded.

The film thickness measurement apparatus and the film thickness measurement method according to the present invention are not limited to the embodiments described above, and various other modifications can be made. For example, the peak wavelength of an interfering light spectrum or the number of repetitions of an interfering light spectral waveform per unit wavelength is obtained in order to obtain the film thickness d of the measuring object (semiconductor film 15) in the above-described embodiments, but values useful for obtaining the film thickness d are not limited to these, and the film thickness d can be suitably obtained as long as a value corresponding to a peak wavelength and an interval of adjacent peak wavelengths or a value corresponding to the interval are used.

A film thickness measurement apparatus according to the above-described embodiment is for measuring a temporal change in film thickness of a film-shaped measuring object having a first surface and a second surface, and the film thickness measurement apparatus includes a measurement light source that supplies measurement light containing wavelength components over a predetermined band to the measuring object, detection means that detects intensities of output light, formed by superimposing reflected light of the measurement light from the first surface of the measuring object and reflected light of the measurement light from the second surface, at each time point for respective wavelengths, and film thickness analysis means that obtains a temporal change in film thickness of the measuring object, and the film thickness analysis means obtains a value corresponding to a peak wavelength where an intensity of interfering light generated by the reflected light from the first surface and the reflected light from the second surface interfering with each other is maximized or minimized or an interval of the adjacent peak wavelengths based on spectral waveforms of the output light detected at two or more time points different from each other by the detection means, and obtains a temporal change in film thickness of the measuring object from a temporal change in the value corresponding to the peak wavelength or the interval of the adjacent peak wavelengths.

A film thickness measurement method according to the above-described embodiment is for measuring a temporal change in film thickness of a film-shaped measuring object having a first surface and a second surface, and the film thickness measurement method includes a measurement light supply step of supplying measurement light containing wavelength components over a predetermined band from a measurement light source to the measuring object, a detection step of detecting intensities of output light, formed by superimposing reflected light of the measurement light from the first surface of the measuring object and reflected light of the measurement light from the second surface, at each time point for respective wavelengths, and a film thickness analysis step of obtaining a temporal change in film thickness of the measuring object, and in the film thickness analysis step, a value corresponding to a peak wavelength where an intensity of interfering light generated by the reflected light from the first surface and the reflected light from the second surface interfering with each other is maximized or minimized or an interval of the adjacent peak wavelengths is obtained based on spectral waveforms of the output light detected at two or more time points different from each other in the detection step, and a temporal change in film thickness of the measuring object is obtained from a temporal change in the value corresponding to the peak wavelength or the interval of the adjacent peak wavelengths.

The film thickness measurement apparatus may be configured so that the film thickness analysis means calculates a difference $I(T_2)-I(T_1)$ between a first spectral waveform $I(T_1)$ regarding the output light detected at a first time point $T_1$ and a second spectral waveform $I(T_2)$ regarding the output light detected at a second time point $T_2$ different from the first time point $T_1$, and determines a wavelength where the difference becomes zero as the peak wavelength.

Similarly, the film thickness measurement method may be configured so that in the film thickness analysis step, a difference $I(T_2)-I(T_1)$ between a first spectral waveform $I(T_1)$ regarding the output light detected at a first time point $T_1$ and a second spectral waveform $I(T_2)$ regarding the output light detected at a second time point $T_2$ different from the first time point $T_1$ is calculated, and a wavelength where the difference becomes zero is determined as the peak wavelength.

As described above, a center wavelength of an unnecessary peak such as a bright line spectrum caused by the light source remains unchanged irrespective of a change in film thickness of the measuring object. Therefore, because the first spectral waveform $I(T_1)$ and the second spectral waveform $I(T_2)$ are the same in the center wavelength of a bright line spectrum, etc., contained in the waveforms $I(T_1)$, $I(T_2)$, its influence is eliminated by calculating a difference $I(T_2)-I(T_1)$. A wavelength (hereinafter, referred to as a zero-cross wavelength) where the difference becomes zero is located between a peak wavelength of interfering light contained in the waveform $I(T_1)$ and a peak wavelength of interfering light contained in the waveform $I(T_2)$, and the zero-cross wavelength can be regarded as a peak wavelength of the interfering light when an interval between the first and second time points $T_1$, $T_2$ is not long. Therefore, from the amount of change in the zero-cross wavelength, a temporal change in film thickness of the measuring object can be accurately obtained.

When a wavelength where the difference $I(T_2)-I(T_1)$ becomes zero is determined as the peak wavelength to obtain a temporal change in film thickness of the measuring object, it is preferable that the film thickness analysis means normalizes the difference by use of a waveform $I(T_1)+I(T_2)$ for which the first spectral waveform $I(T_1)$ and the second spectral waveform $I(T_2)$ are superimposed, and then determines the peak wavelength.

Similarly, in the film thickness measurement method, it is preferable that, in the film thickness analysis step, the difference is normalized by use of a waveform $I(T_1)+I(T_2)$ for which the first spectral waveform $I(T_1)$ and the second spectral waveform $I(T_2)$ are superimposed, and then the peak wavelength is determined.

Accordingly, even when the size of the difference $I(T_1)-I(T_2)$ greatly varies depending on the wavelength because the intensity of the measurement light varies depending on the wavelength, a favorable spectral waveform concerning the difference $I(T_2)-I(T_1)$ can be obtained.

The film thickness measurement apparatus may be configured so that the film thickness analysis means calculates a ratio $I(T_2)/I(T_1)$ of a first spectral waveform $I(T_1)$ regarding the output light detected at a first time point $T_1$ and a second spectral waveform $I(T_2)$ regarding the output light detected at a second time point $T_2$ different from the first time point $T_1$, and determines a wavelength where the ratio becomes 1 as the peak wavelength.

Similarly, the film thickness measurement method may be configured so that, in the film thickness analysis step, a ratio $I(T_2)/I(T_1)$ of a first spectral waveform $I(T_1)$ regarding the output light detected at a first time point $T_1$ and a second spectral waveform $I(T_2)$ regarding the output light detected at a second time point $T_2$ different from the first time point $T_1$ is calculated, and a wavelength where the ratio becomes 1 is determined as the peak wavelength.

As previously described, the first spectral waveform $I(T_1)$ and the second spectral waveform $I(T_2)$ are the same in the center wavelength of a bright line spectrum, etc., contained in the waveforms $I(T_1)$, $I(T_2)$. Therefore, its influence is eliminated by calculating a ratio $I(T_2)/I(T_1)$. A wavelength where this ratio becomes 1 is located between a peak wavelength of interfering light contained in the waveform $I(T_1)$ and a peak wavelength of interfering light contained in the waveform $I(T_2)$, and this wavelength can be regarded as a peak wavelength of the interfering light when an interval between the first and second time points $T_1$, $T_2$ is not long. Therefore, from the amount of change in this wavelength, a temporal change in film thickness of the measuring object can be accurately obtained.

The film thickness measurement apparatus may be configured so that the film thickness analysis means obtains the value corresponding to the interval of the adjacent peak wavelengths based on a first Fourier-transformed waveform $F\{I(T_1)\}$ and a second Fourier-transformed waveform $F\{I(T_2)\}$ obtained by Fourier-transforming a first spectral waveform $I(T_1)$ regarding the output light detected at a first time point $T_1$ and a second spectral waveform $I(T_2)$ regarding the output light detected at a second time point $T_2$ different from the first time point $T_1$, respectively, and obtains the temporal change in film thickness of the measuring object from a temporal change in the value.

Similarly, the film thickness measurement method may be configured so that, in the film thickness analysis step, the value corresponding to the interval of the adjacent peak wavelengths is obtained based on a first Fourier-transformed waveform $F\{I(T_1)\}$ and a second Fourier-transformed waveform $F\{I(T_2)\}$ obtained by Fourier-transforming a first spectral waveform $I(T_1)$ regarding the output light detected at a first time point $T_1$ and a second spectral waveform $I(T_2)$ regarding the output light detected at a second time point $T_2$ different from the first time point $T_1$, respectively, and the temporal change in film thickness of the measuring object is obtained from a temporal change in the value.

In equation (1) mentioned above, when it is assumed that the refractive index n is fixed with respect to the wavelength $\lambda$, the interfering light intensity I has a cosine waveform with a constant period with respect to a wavenumber $(1/\lambda)$. Therefore, from a value corresponding to an interval of adjacent peak wavelengths in the cosine waveform, for example, the number of repetitions of a spectral waveform of the interfering light intensity I per unit wavelength, the film thickness of the measuring object can be obtained. Specifically, in the film thickness measurement apparatus and the film thickness measurement method described above, a value corresponding to an interval of the adjacent peak wavelengths is obtained from the waveforms $F\{I(T_1)\}$, $F\{I(T_2)\}$ obtained by Fourier-transforming the spectral waveforms $I(T_1)$, $I(T_2)$. Then, a temporal change in film thickness of the measuring object is obtained from a temporal change in the value.

Accordingly, a temporal change in film thickness of the measuring object can be accurately obtained. Here, as previously described, because the first spectral waveform $I(T_1)$ and the second spectral waveform $I(T_2)$ are the same in the waveform of a bright line spectrum, etc., contained in the waveforms $I(T_1)$, $I(T_2)$, the waveform of a bright line spectrum, etc., is the same also in the waveforms after a Fourier transform $F\{I(T_1)\}$, $F\{I(T_2)\}$, and according to the film thickness measurement apparatus and the film thickness measurement method described above, its influence can be suitably eliminated.

For the film thickness measurement apparatus, it is preferable that the value corresponding to the interval of the adjacent peak wavelengths is the number of repetitions in the spectral waveform of interfering light per unit wavelength. Alternatively, for the film thickness measurement apparatus, it is preferable that the value corresponding to the interval of the adjacent peak wavelengths is a phase converted from the number of repetitions in the spectral waveform of interfering light per unit wavelength.

Similarly, for the film thickness measurement method, it is preferable that the value corresponding to the interval of the adjacent peak wavelengths is the number of repetitions in the spectral waveform of interfering light per unit wavelength. Alternatively, for the film thickness measurement method, it is preferable that the value corresponding to the interval of the adjacent peak wavelengths is a phase converted from the number of repetitions in the spectral waveform of interfering light per unit wavelength.

It is preferable that the specific measuring object whose temporal change in film thickness is to be measured is a semiconductor film on a substrate, and a temporal change in film thickness of the semiconductor film is measured during execution of a predetermined process. With this configuration, as described above, during execution of a semiconductor process such as an etching process or a thin-film formation process, a temporal change amount of the film thickness can be measured, and process control such as detection of an end point of the process can be accurately performed.

In the film thickness measurement apparatus and the film thickness measurement method described above, as the measurement light source, a white light source which supplies white light over the predetermined band as the measurement light may be used. Various measurement light sources other than the white light source can also be used.

INDUSTRIAL APPLICABILITY

The present invention can be used as a film thickness measurement apparatus and a film thickness measurement method by which, even with such a minute amount of relative change in film thickness as to be less than one peak period of the interfering light intensity, the amount of change in film thickness can be accurately measured.

REFERENCE SIGNS LIST

1A—film thickness measurement apparatus, 10—sample, 12—substrate, 15—semiconductor film, 16—upper surface, 17—lower surface, 20—processing unit, 21—measurement optical system, 22—stage, 23—stage control section, 24—imaging device, 25—measurement position setting section, 28—measurement light source, 30—spectroscopic optical system, 31—photodetector, 40—film thickness analysis section, 50—measurement control section, 51—input device, 52—display device.

The invention claimed is:

1. A film thickness measurement apparatus for measuring a temporal change in film thickness of a film-shaped measuring object having a first surface and a second surface, comprising:
a measurement light source supplying measurement light containing wavelength components over a predetermined band to the measuring object;
detection means detecting intensities of output light, formed by superimposing reflected light of the measurement light from the first surface of the measuring object and reflected light of the measurement light from the second surface, at each time point by wavelength; and
film thickness analysis means obtaining a temporal change in film thickness of the measuring object, wherein
the film thickness analysis means obtains a value corresponding to a peak wavelength where an intensity of interfering light generated by the reflected light from the first surface and the reflected light from the second surface interfering with each other is maximized or minimized or an interval of the adjacent peak wavelengths based on spectral waveforms of the output light respectively detected at two or more time points different from each other by the detection means, and obtains a temporal change in film thickness of the measuring object from a temporal change in the value corresponding to the peak wavelength or the interval of the adjacent peak wavelengths, and wherein
the film thickness analysis means calculates a difference $I(T_2)-I(T_1)$ between a first spectral waveform $I(T_1)$ regarding the output light detected at a first time point $T_1$ and a second spectral waveform $I(T_2)$ regarding the output light detected at a second time point $T_2$ different from the first time point $T_1$, and determines a zero-cross wavelength where the difference becomes zero as the peak wavelength.

2. The film thickness measurement apparatus according to claim 1, wherein the film thickness analysis means normalizes the difference by use of a waveform $I(T_1)+I(T_2)$ for which the first spectral waveform $I(T_1)$ and the second spectral waveform $I(T_2)$ are superimposed, and then determines the peak wavelength.

3. The film thickness measurement apparatus according to claim 1, wherein the measuring object is a semiconductor film on a substrate, and a temporal change in film thickness of the semiconductor film is measured during execution of a predetermined process.

4. The film thickness measurement apparatus according to claim 1, wherein the measurement light source is a white light source which supplies white light over the predetermined band as the measurement light.

5. A film thickness measurement method for measuring a temporal change in film thickness of a film-shaped measuring object having a first surface and a second surface, comprising:
a measurement light supply step of supplying measurement light containing wavelength components over a predetermined band from a measurement light source to the measuring object;
a detection step of detecting intensities of output light, formed by superimposing reflected light of the measurement light from the first surface of the measuring object and reflected light of the measurement light from the second surface, at each time point by wavelength; and
a film thickness analysis step of obtaining a temporal change in film thickness of the measuring object, wherein
in the film thickness analysis step, a value corresponding to a peak wavelength where an intensity of interfering light generated by the reflected light from the first surface and the reflected light from the second surface interfering with each other is maximized or minimized or an interval of the adjacent peak wavelengths is obtained based on spectral waveforms of the output light respectively detected at two or more time points different from each other in the detection step, and a temporal change in film thickness of the measuring object is obtained from a temporal change in the value corresponding to the peak wavelength or the interval of the adjacent peak wavelengths, and wherein
in the film thickness analysis step, a difference $I(T_2)-I(T_1)$ between a first spectral waveform $I(T_1)$ regarding the output light detected at a first time point $T_1$ and a second spectral waveform $I(T_2)$ regarding the output light detected at a second time point $T_2$ different from the first time point $T_1$ is calculated, and a zero-cross wavelength where the difference becomes zero is determined as the peak wavelength.

6. The film thickness measurement method according to claim 5, wherein in the film thickness analysis step, the difference is normalized by use of a waveform $I(T_1)+I(T_2)$ for which the first spectral waveform $I(T_1)$ and the second spectral waveform $I(T_2)$ are superimposed, and then the peak wavelength is determined.

7. The film thickness measurement method according to claim 5, wherein the measuring object is a semiconductor film on a substrate, and a temporal change in film thickness of the semiconductor film is measured during execution of a predetermined process.

8. The film thickness measurement method according to claim 5, wherein the measurement light source is a white light source which supplies white light over the predetermined band as the measurement light.

9. An apparatus for measuring a temporal change in thickness of an object having at least a first surface and a second surface, comprising:

a light source configured to supply measurement light;

a detector configured to detect interfering light, formed by the measurement light reflected from the first surface and the measurement light reflected from the second surface; and an analysis system configured to obtain a temporal change in thickness of the object, wherein the analysis system calculates a difference spectral waveform between a first interfering spectral waveform at a first time point and a second interfering spectral waveform at a second time point different from the first time point, determines a zero-cross wavelength where the difference becomes zero, and obtains the temporal change in thickness of the object based on a temporal change in the zero-cross wavelength.

10. A method for measuring a temporal change in thickness of an object having at least a first surface and a second surface, comprising:

supplying measurement light;

acquiring a first interfering spectral waveform corresponding to first interfering light, formed by the measurement light reflected from the first surface and the measurement light reflected from the second surface, at a first time point;

acquiring a second interfering spectral waveform corresponding to second interfering light, formed by the measurement light reflected from the first surface and the measurement light reflected from the second surface, at a second time point different from the first time point;

calculating a difference spectral waveform between the first interfering spectral waveform and the second interfering spectral waveform;

determining a zero-cross wavelength where the difference becomes zero; and obtaining a temporal change in thickness of the object based on a temporal change in the zero-cross wavelength.

* * * * *